(12) United States Patent
Kim et al.

(10) Patent No.: US 12,346,169 B2
(45) Date of Patent: Jul. 1, 2025

(54) ELECTRONIC DEVICE INCLUDING SUPPORT STRUCTURE

(71) Applicant: Samsung Electronics Co., Ltd., Gyeonggi-do (KR)

(72) Inventors: Taejeong Kim, Gyeonggi-do (KR); Byounggyu Park, Gyeonggi-do (KR); Kyungtae Kim, Gyeonggi-do (KR); Moonsoo Kim, Gyeonggi-do (KR); Garam Lee, Gyeonggi-do (KR); Junyoung Choi, Gyeonggi-do (KR); Jungyup Han, Gyeonggi-do (KR); Junghwan Kim, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 221 days.

(21) Appl. No.: 18/117,581

(22) Filed: Mar. 6, 2023

(65) Prior Publication Data

US 2023/0297143 A1     Sep. 21, 2023

Related U.S. Application Data

(63) Continuation of application No. PCT/KR2023/002811, filed on Feb. 28, 2023.

(30) Foreign Application Priority Data

Mar. 17, 2022 (KR) .................. 10-2022-0033628
Jun. 28, 2022 (KR) .................. 10-2022-0079102
Dec. 8, 2022 (KR) .................. 10-2022-0170366

(51) Int. Cl.
*G06F 1/16*     (2006.01)
*H04M 1/02*    (2006.01)

(52) U.S. Cl.
CPC .......... *G06F 1/1656* (2013.01); *G06F 1/1624* (2013.01); *G06F 1/1652* (2013.01); *H04M 1/0237* (2013.01); *H04M 1/0268* (2013.01)

(58) Field of Classification Search
CPC combination set(s) only.
See application file for complete search history.

(56) References Cited

U.S. PATENT DOCUMENTS 10,963,014 B1    3/2021   Park et al.
11,012,546 B1    5/2021   Song et al.
(Continued)

FOREIGN PATENT DOCUMENTS

CN    113194176 A    7/2021
EP    3842895 A1     6/2021
(Continued)

OTHER PUBLICATIONS

International Search Report dated May 12, 2023.
Extended European Search report dated May 7, 2025.

*Primary Examiner* — Hung S. Bui
*Assistant Examiner* — Elisa Sasserath
(74) *Attorney, Agent, or Firm* — Cha & Reiter, LLC

(57) ABSTRACT

An electronic device comprises housings including a first housing and a second housing configured to accommodate at least a portion of the first housing and guide sliding of the first housing, a flexible display including a first display area and a second display area extending from the first display area, and a monolithic support structure configured to support at least a portion of the second display area. The support structure includes a plate part and a plurality of bar-shaped parts protruding side by side from the plate part and disposed parallel to the plate part. The plate part and the plurality of bar-shaped parts are formed from a single monolithic structure. Each of the plurality of bar-shaped parts includes a second portion extending from the plate part and a first (Continued)

portion extending from the second portion, and a first width of the first portion is greater than a second width of the second portion. The plate part includes a plurality of openings located between adjacent ones of the bar-shaped parts.

20 Claims, 27 Drawing Sheets

(56) References Cited

U.S. PATENT DOCUMENTS

| | | | |
|---|---|---|---|
| 2016/0231784 A1* | 8/2016 | Yu | G02F 1/133305 |
| 2016/0231843 A1* | 8/2016 | Kim | G06F 3/0412 |
| 2017/0285688 A1 | 10/2017 | Sun | |
| 2018/0255219 A1* | 9/2018 | Ramaprakash | H04N 23/90 |
| 2020/0174526 A1* | 6/2020 | Jeong | G09F 9/301 |
| 2020/0218372 A1* | 7/2020 | Yilmaz | G06F 3/0442 |
| 2021/0005635 A1* | 1/2021 | Ban | H10K 59/1201 |
| 2021/0385315 A1* | 12/2021 | Cha | G06F 1/1675 |
| 2022/0201880 A1* | 6/2022 | Choi | G06F 1/1637 |
| 2022/0253103 A1 | 8/2022 | Choi et al. | |
| 2023/0007113 A1 | 1/2023 | Seol et al. | |

FOREIGN PATENT DOCUMENTS

| | | |
|---|---|---|
| KR | 10-1966787 B1 | 4/2019 |
| KR | 10-2021-0062336 A | 5/2021 |
| KR | 10-2022-0091330 A | 6/2022 |
| KR | 10-2023-0107201 A | 7/2023 |
| WO | 2021/015310 A1 | 1/2021 |
| WO | 2021/151473 A1 | 8/2021 |
| WO | 2021/225192 A1 | 11/2021 |
| WO | 2021/246561 A1 | 12/2021 |

* cited by examiner

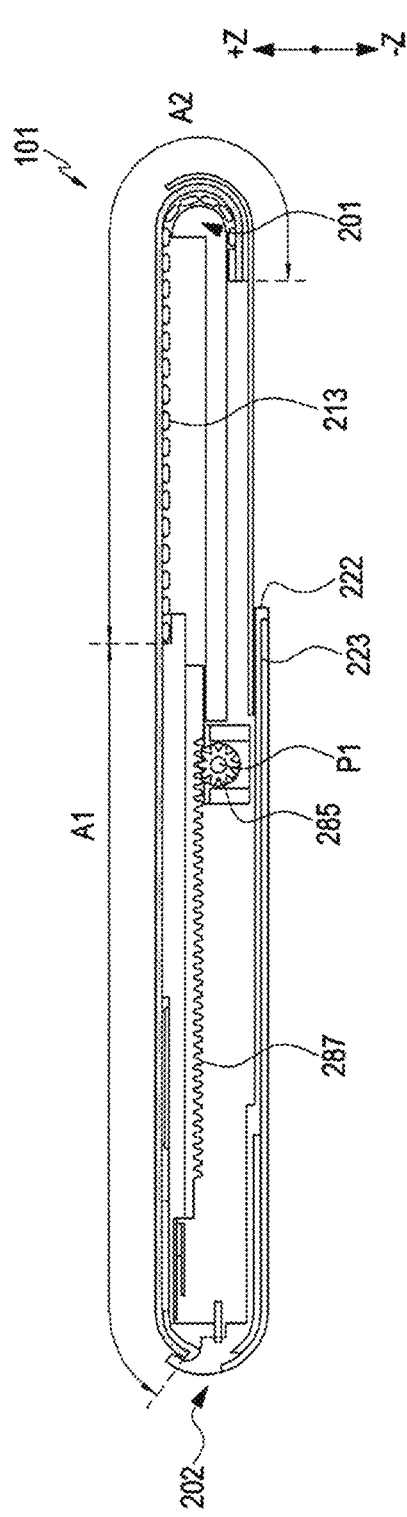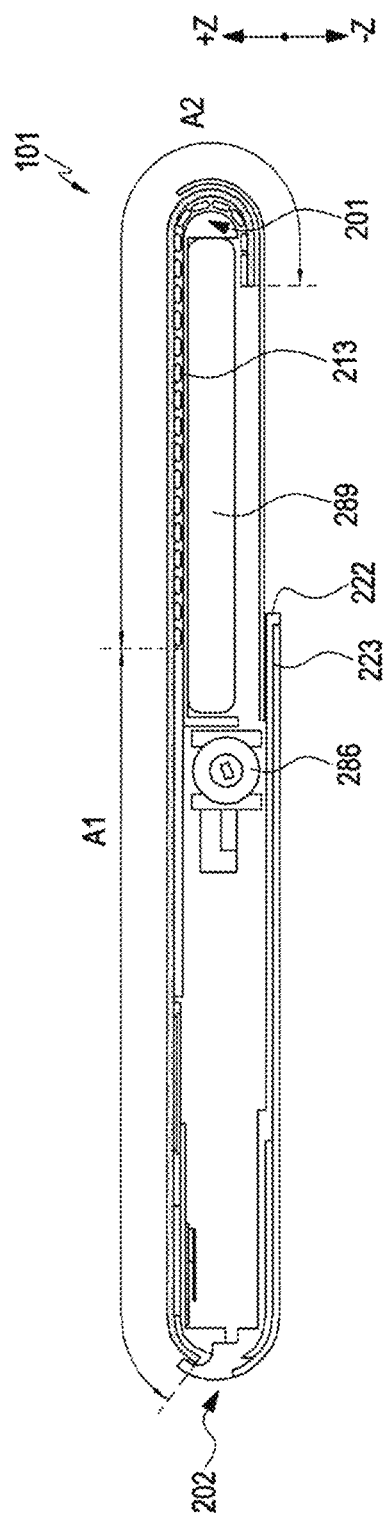
FIG.6A
FIG.6B

ELECTRONIC DEVICE INCLUDING SUPPORT STRUCTURE

CROSS-REFERENCE TO RELATED APPLICATION(S)

This application is a continuation of International Application No. PCT/KR2023/002811, which was filed on Feb. 28, 2023, and claims priority to Korean Patent Application Nos. 10-2022-0033628, 10-2022-0079102, and 10-2022-0170366, filed on Mar. 17, 2022, Jun. 28, 2022, and Dec. 8, 2022, respectively, in the Korean Intellectual Property Office, the disclosure of which are incorporated by reference herein their entirety.

BACKGROUND

Technical Field

One or more embodiments of the disclosure relate to an electronic device including a support structure.

Description of Related Art

As information and communication technology and semiconductor technology have developed, various functions are being integrated into a single portable electronic device. For example, an electronic device may implement various functions, such as entertainment function (e.g., game function), multimedia function (e.g., music/video replay function), communication and security function for mobile banking, schedule management function, and e-wallet function, in addition to communication function. Such electronic devices have been miniaturized to be conveniently carried by the user.

As mobile communication service is extended to include multimedia service, it is necessary to increase the size of the display of the electronic device in order to allow users to fully utilize the multimedia service. However, the size of the display of the electronic device is in a trade-off relationship with the miniaturization of the electronic device.

SUMMARY

According to an embodiment, an electronic device may include housings including a first housing and a second housing configured to accommodate at least a portion of the first housing and guide sliding of the first housing, a flexible display including a first display area and a second display area extending from the first display area, and a monolithic support structure configured to support at least a portion of the second display area. The support structure includes a plate part and a plurality of bar-shaped parts protruding side by side from the plate part and disposed parallel to the plate part. The plate part and the plurality of bar-shaped parts are formed from a single monolithic structure. Each of the plurality of bar-shaped parts includes a second portion extending from the plate part and a first portion extending from the second portion, and a first width of the first portion is greater than a second width of the second portion. The plate part includes a plurality of openings located between adjacent ones of the bar-shaped parts.

According to an embodiment, a method of manufacturing a support structure used in a device may include forming a plurality of bar-shaped parts by cutting at least a portion of a second surface of a support material comprising a first surface and a the second surface opposite to the first surface, forming a plurality of protrusions by cutting at least a portion of the a side surface connecting the first surface and the second surface of the support material, and forming a first area by etching at least a portion of the support material. Each of the plurality of bar-shaped parts may include a second portion extending from the second surface and a first portion extending from the second portion, and the second portion has a width smaller than a first width of the first portion is greater than a second width of the second portion. The first area may be located between adjacent ones the plurality of bar-shaped parts and includes a plurality of openings extending from the first surface to the second surface.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6A is a cross-sectional view illustrating associated components of the rack and the gear connected to the motor in the state in which the electronic device according to an embodiment of the disclosure is opened. FIG. 6B is a cross-sectional view illustrating an arrangement relationship of the motor and the battery in the state in which the electronic device according to an embodiment of the disclosure is opened.

DETAILED DESCRIPTION

Figure 1:
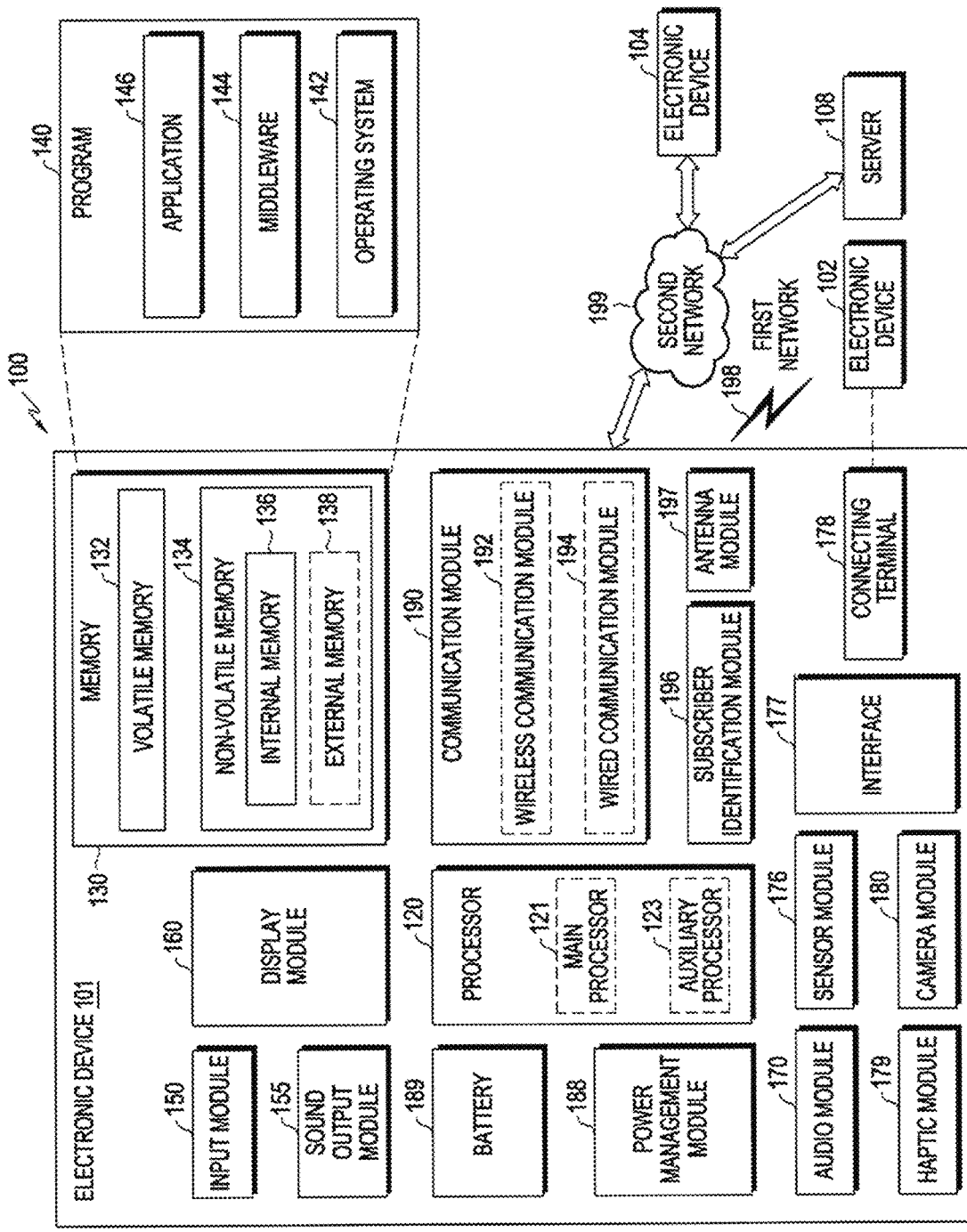
FIG. 1 is a block diagram of an electronic device according to an embodiment of the disclosure in a network environment.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to an embodiment, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more external devices of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to an embodiment may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that an embodiment of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with an embodiment of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

According to an embodiment, each component (e.g., a module or a program) of the above-described components may include a single entity or multiple entities, and some of the multiple entities may be separately disposed in different components. According to an embodiment, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Figure 2:
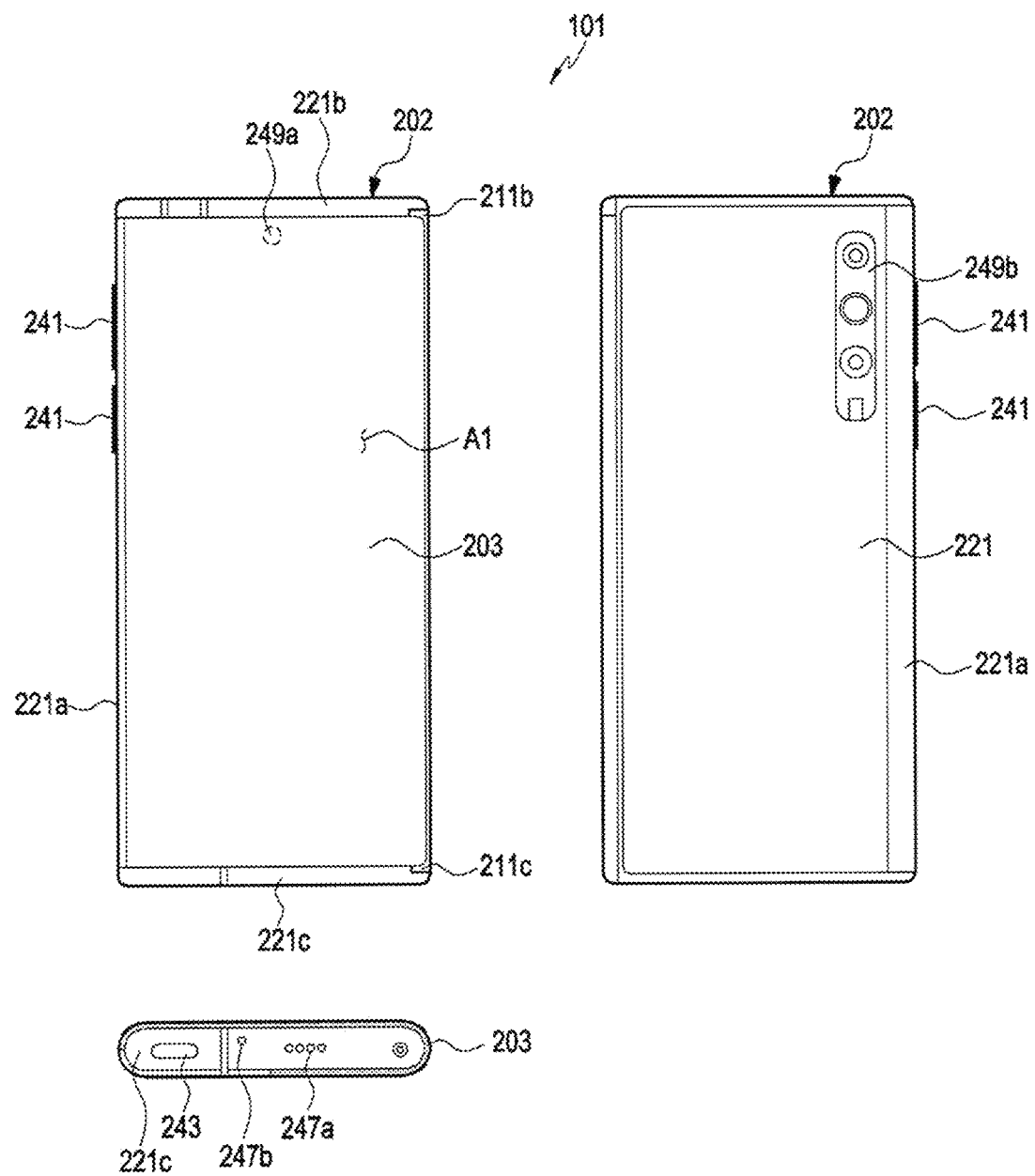
FIG. 2 is a view illustrating a state in which a second display area of a display according to one of an embodiment of the disclosure is accommodated in a second housing.
Figure 3:
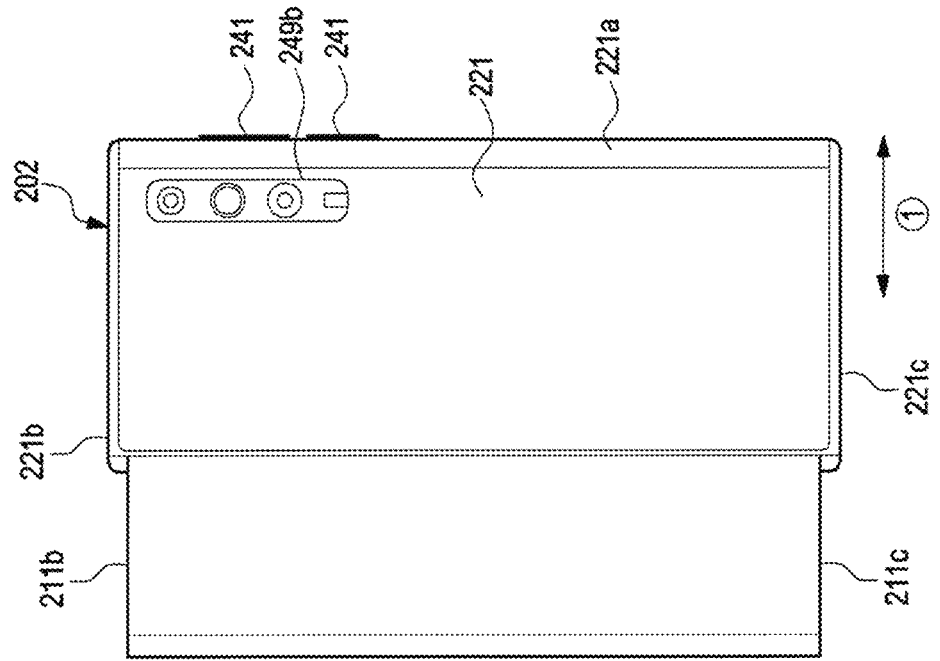
FIG. 3 is a view illustrating a state in which the second display area of the display according to one of an embodiment of the disclosure is exposed to the outside of the second housing.
Figure 3:
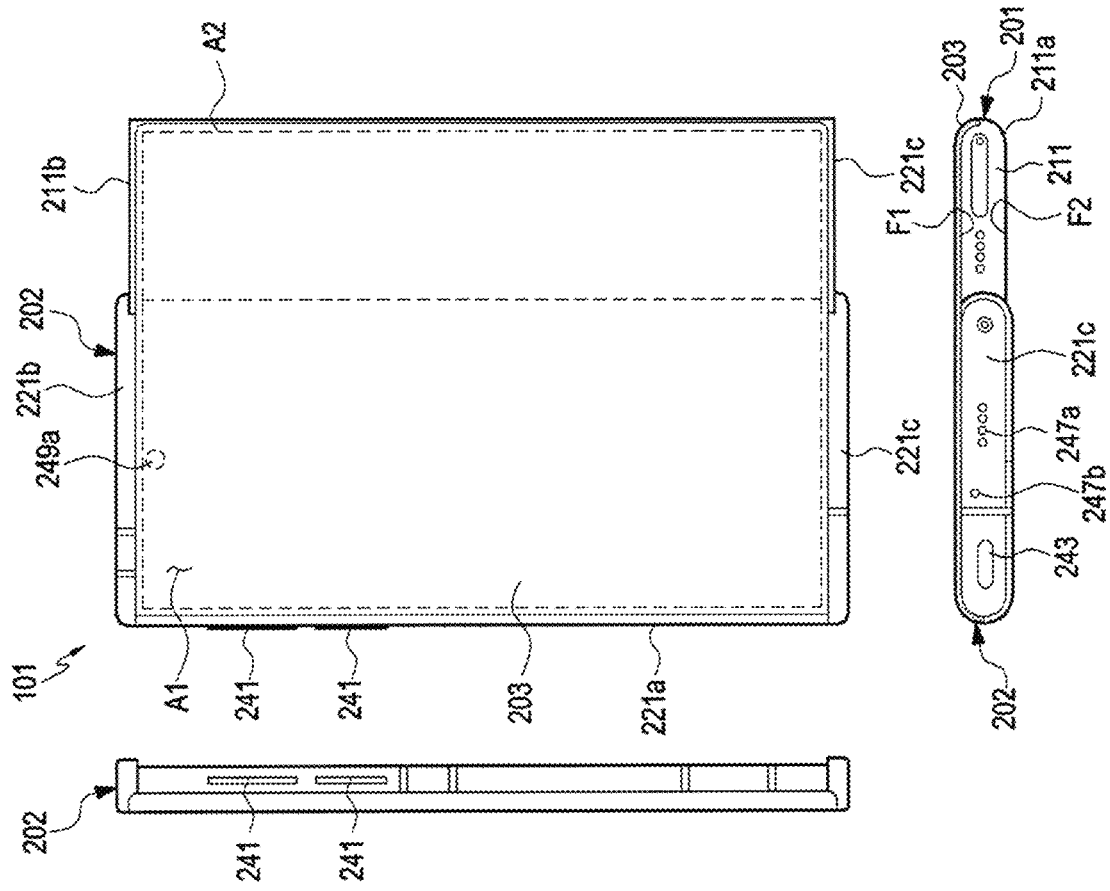

FIG. 2 is a view illustrating a state in which a second display area of a display according to one of an embodiment of the disclosure is accommodated in a second housing. FIG. 3 is a view illustrating a state in which the second display area of the display according to one of an embodiment of the disclosure is exposed to the outside of the second housing.

FIGS. 2 and 3 illustrate a structure in which a display 203 (e.g., flexible display) extends to the right direction when the electronic device 101 is viewed from the front. However, the expansion direction of the display 203 is not limited to one direction (e.g., the right direction), and the display may be designed to be expandable to the left direction, to the vertical direction, and/or multiple directions.

The state illustrated in FIG. 2 may be defined as the state in which the first housing 201 is closed relative to the second housing 202, and the state illustrated in FIG. 3 may be defined as the state in which the first housing 201 is opened relative to the second housing 202. In some embodiments, the "closed state" or the "opened state" may refer to the state in which the electronic device 101 is closed or opened. According to an embodiment, the "closed state" may be defined as an at least one of a rolled state, a bended state, and a first state. The "opened state" may be defined as an at least one of an expanded state, a stretched state, an unbended state, and a second state.

Referring to FIGS. 2 and 3, the electronic device 101 may include housings 201 and 202. The housings 201 and 202 may include a second housing 202 and a first housing 201 disposed to be movable relative to the second housing 202. In some embodiments, the electronic device 101 may have a structure in which the second housing 202 is disposed to be slidable on the first housing 201. According to an embodiment, the first housing 201 may be disposed to be reciprocable by a predetermined distance in the illustrated direction (e.g., arrow ① direction) relative to the second housing 202.

According to an embodiment, the first housing 201 may be referred to as, for example, a first structure, a slide unit, or a slide housing that may be disposed to be reciprocable on the second housing 202. According to an embodiment, the first housing 201 may accommodate various electrical and electronic components such as a circuit board or a battery. The second housing 202 may be referred to as, for example, a second structure, a main unit, or a main housing that may guide the movement of the first housing 201. A portion of the display 203 (e.g., first display area A1) may be seated on the first housing 201. According to an embodiment, when the first housing 201 moves (e.g., slides) relative to the second housing 202, another portion of the display 203 (e.g., a second display area A2) may be accommodated inside the second housing 202 (e.g., a slide-in operation) or exposed to the outside of the second housing 202 (e.g., a slide-out operation). According to an embodiment, a motor, a speaker, a SIM socket, and/or a sub-circuit board electrically connected to a main circuit board may be disposed in the first housing 201. The main circuit board on which electrical and/or electronic components such as an application processor (AP) and a communication processor (CP) are mounted may be disposed in the second housing 202.

According to an embodiment, the first housing 201 may include a first plate 211 (e.g., a slide plate). The first plate 211 may include a first surface (e.g., the first surface F1 in FIG. 3) and a second surface F2 facing away from the first surface F1. According to an embodiment, the first plate 211 may support at least a portion of the display 203 (e.g., the second display area A2). According to an embodiment, the first housing 201 may include a first plate 211, a $(1\text{-}1)^{th}$ side wall 211a extending from the first plate 211, a $(1\text{-}2)^{th}$ side wall 211b extending from the $(1\text{-}1)^{th}$ side wall 211a and the first plate 211, and a $(1\text{-}3)^{th}$ side wall 211c extending from the $(1\text{-}1)^{th}$ side wall 211a and the first plate 211 and substantially parallel to the $(1\text{-}2)^{th}$ side wall 211b.

According to an embodiment, the second housing 202 may include a second plate 221 (e.g., the main case), a $(2\text{-}1)^{th}$ side wall 221a extending from the second plate 221, a $(2\text{-}2)^{th}$ side wall 221b extending from the $(2\text{-}1)^{th}$ side wall 221a and the second plate 221, and a $(2\text{-}3)^{th}$ side wall 221c extending from the $(2\text{-}1)^{th}$ side wall 221a and the second plate 221 and substantially parallel to the $(2\text{-}2)^{th}$ sidewall 221b. According to an embodiment, the $(2\text{-}2)^{th}$ side wall 221b and the $(2\text{-}3)^{th}$ side wall 221c may be substantially perpendicular to the $(2\text{-}1)^{th}$ side wall 221a. According to an embodiment, the second plate 221, the $(2\text{-}1)^{th}$ side wall 221a, the $(2\text{-}2)^{th}$ side wall 221b, and the $(2\text{-}3)^{th}$ side wall 221c may implement a shape that is opened on one side (e.g., the front surface) to accommodate (or surround) at least a portion of the first housing 201. For example, the first housing 201 may be coupled to the second housing 202 while being at least partially surrounded by the same and may slide in a direction parallel to the first surface F1 or the second surface F2 (e.g., arrow ① direction) while being guided by the second housing 202. According to an embodiment, the second plate 221, the $(2\text{-}1)^{th}$ side wall 221a, the $(2\text{-}2)^{th}$ side wall 221b, and/or the $(2\text{-}3)^{th}$ side wall 221c may be manufactured as an integrated piece. According to an embodiment, the second plate 221, the $(2\text{-}1)^{th}$ side wall 221a, the $(2\text{-}2)^{th}$ side wall 221b, and/or the $(2\text{-}3)^{th}$ side wall 221c may be configured as separate components and coupled to or assembled with each other.

According to an embodiment, the second plate 221 and/or the $(2\text{-}1)^{th}$ side wall 221a may cover at least a portion of the display 203. For example, at least a portion of the display 203 may be accommodated into the second housing 202, and the second plate 221 and/or the $(2\text{-}1)^{th}$ side wall 221a may cover a portion of the display 203 accommodated inside the second housing 202.

According to an embodiment, the first housing 201 may be movable in a first direction (e.g., arrow ① direction) parallel to the $(2\text{-}2)^{th}$ side wall 221b or the $(2\text{-}3)^{th}$ side wall 221c to be in the opened state or the closed state relative to the second housing 202, and the first housing 201 may be movable to be located at a first distance from the $(2\text{-}1)^{th}$ sidewall 221a in the closed state and at a second distance, which is greater than the first distance, from the $(2\text{-}1)^{th}$ sidewall 221a in the opened state. In some embodiments, when in the closed state, the first housing 201 may surround a portion of the $(2\text{-}1)^{th}$ side wall 221a.

According to an embodiment, the electronic device 101 may have an intermediate state between the slide-in state of FIG. 2 (e.g., fully closed state) and the slide-out state of FIG.

3 (e.g., fully opened state). In the intermediate state of the electronic device 101, a distance between the $(1-1)^{th}$ side wall 211a and the $(2-1)^{th}$ side wall 221a may be smaller than a distance between the $(1-1)^{th}$ side wall 211a and the $(2-1)^{th}$ side wall 221a in a completely opened state. In the intermediate state of the electronic device 101, a distance between the $(1-1)^{th}$ side wall 211a and the $(2-1)^{th}$ side wall 221a may be larger than a distance between the $(1-1)^{th}$ side wall 211a and the $(2-1)^{th}$ side wall 221a in a completely closed state. According to an embodiment, as at least a portion of the display 203 slides in an intermediate state of the electronic device 101, an area exposed to the outside may change. For example, in the intermediate state of the electronic device 101, the ratio of the width (length in the X direction) to the height (length in the Y direction) of the display 203 and/or a distance between the $(1-1)^{th}$ side wall 211a and the $(2-1)^{th}$ side wall 221a may be changed based on the slide movement of the electronic device 101. According to an embodiment, the electronic device 101 may include a display 203, key input devices 241, a connector hole 243, audio modules 247a and 247b, or camera modules 249a and 249b. Although not illustrated, the electronic device 101 may further include an indicator (e.g., LED device) or various sensor modules.

According to an embodiment, the display 203 may include a first display area A1 and a second display area A2. According to an embodiment, the first display area A1 may be disposed on the second housing 202. The second display area A2 may extend from the first display area A1 and may be inserted or accommodated into the inside of the second housing 202 (e.g., a structure) or may be exposed to the outside of the second housing 202 according to the sliding of the first housing 201.

According to an embodiment, the second display area A2 may move while being substantially guided by an area of the first housing 201 (e.g., the curved surface 250 in FIG. 4A) to be accommodated into the inside of the second housing 202 or a space defined between the first housing 201 and the second housing 202 or to be exposed to the outside. According to an embodiment, the second display area A2 may be moved based on the sliding of the first housing 201 in the first direction (e.g., arrow ① direction). For example, while the first housing 201 slides, a portion of the second display area A2 may be transformed into a curved shape at a position corresponding to the curved surface 250 of the first housing 201.

According to an embodiment, when viewed from above the first plate 211 (e.g., the slide plate), if the first housing 201 moves from the closed state to the opened state, the second display area A2 may have a substantially flat surface coplanar with the first display area A1 while being gradually exposed to the outside of the second housing 202. The display 203 may be coupled to or disposed adjacent to a touch detection circuit, a pressure sensor capable of measuring touch intensity (pressure), and/or a digitizer configured to detect a magnetic field-type stylus pen. In an embodiment, the second display area A2 may be at least partially accommodated inside the second housing 202, and even in the state illustrated in FIG. 2 (e.g., the closed state), a portion of the second display area A2 may be visually exposed to the outside. According to an embodiment, irrespective of the closed state or the opened state, a portion of the exposed second display area A2 may be located on a portion (e.g., the curved surface 250 in FIG. 4A) of the first housing, and at a position corresponding to the curved surface 250, a portion of the second display area A2 may maintain the curved shape.

According to an embodiment, the key input devices 241 may be located in an area of the first housing 201. Depending on the desired design, the electronic device 101 may be designed such that the illustrated key input devices 241 are omitted or an additional key input device(s) is(are) included. According to an embodiment, the electronic device 101 may include a key input device (not illustrated), such as a home key button or a touch pad disposed around the home key button. According to an embodiment, at least some of the key input devices 241 may be disposed on the $(2-1)^{th}$ side wall 221a, the $(2-2)^{th}$ side wall 221b, or the $(2-3)^{th}$ side wall 221c of the second housing 202.

According to an embodiment, the connector hole 243 may be omitted in some embodiments and may accommodate a connector (e.g., a USB connector) for transmitting/receiving power and/or data to/from an external electronic device. Although not illustrated, the electronic device 101 may include a plurality of connector holes 243, and some of the connector holes 243 may function as connector holes for transmitting/receiving audio signals to/from an external electronic device. In the illustrated embodiment, the connector hole 243 is disposed in the $(2-3)^{th}$ side wall 221c, but the disclosure is not limited thereto. The connector hole 243 or another connector hole (not illustrated) may be disposed in the $(2-1)^{th}$ side wall 221a or the $(2-2)^{th}$ side wall 221b.

According to an embodiment, the audio modules 247a and 247b may include one or more speaker holes 247a or one or more microphone holes 247b. One of the speaker holes 247a may be provided as a receiver hole for voice calls, and another one may be provided as an external speaker hole. The electronic device 101 may include a microphone configured to acquire sound, and the microphone may acquire sound from outside the electronic device 101 through the microphone hole 247b. According to an embodiment, the electronic device 101 may include a plurality of microphones to detect the direction of sound. According to an embodiment, the electronic device 101 may include an audio module in which the speaker holes 247a and the microphone holes 247b are implemented as a single hole, or a speaker in which the speaker holes 247a are excluded (e.g., piezo speaker).

According to an embodiment, the camera modules 249a and 249b may include a first camera module 249a and a second camera module 249b. The electronic device 101 may include a plurality of camera modules 249a and 249b. For example, the electronic device 101 may include at least one of a wide-angle camera, a telephoto camera, and a close-up camera. In some embodiments, the electronic device 101 may include an infrared projector and/or an infrared receiver to measure the distance to a subject. The camera modules 249a and 249b may include one or more lenses, image sensors, and/or image signal processors. The first camera module 249a may be disposed to face the same direction as the display 203. For example, the first camera module 249a may be disposed around the first display area A1 or in an area overlapping the display 203, and when disposed in the area overlapping the display 203, the first camera module 249a may image a subject through the display 203. According to an embodiment, the first camera module 249a may include an under-display camera (UDC) which may be hidden without being visually exposed to a screen display area (e.g., the first display area A1). The second camera module 249b may be located in the first housing 201 and may image a subject in a direction opposite to the first display area A1 of the display 203.

According to an embodiment, an indicator (not illustrated) of the electronic device 101 may be disposed on the first housing 201 or the second housing 202 and may include a light-emitting diode to provide state information of the electronic device 101 as a visual signal. A sensor module (not illustrated) of the electronic device 101 may generate an electrical signal or a data value corresponding to an internal operating state of the electronic device 101 or an external environmental state. The sensor module may include, for example, a proximity sensor, a fingerprint sensor, or a biometric sensor (e.g., an iris/face recognition sensor or an HRM sensor). In an embodiment, the sensor module may further include at least one of, for example, a gesture sensor, a gyro sensor, an atmospheric pressure sensor, a magnetic sensor, an acceleration sensor, a grip sensor, a color sensor, an infrared (IR) sensor, a temperature sensor, a humidity sensor, or an illuminance sensor.

Figure 4A:
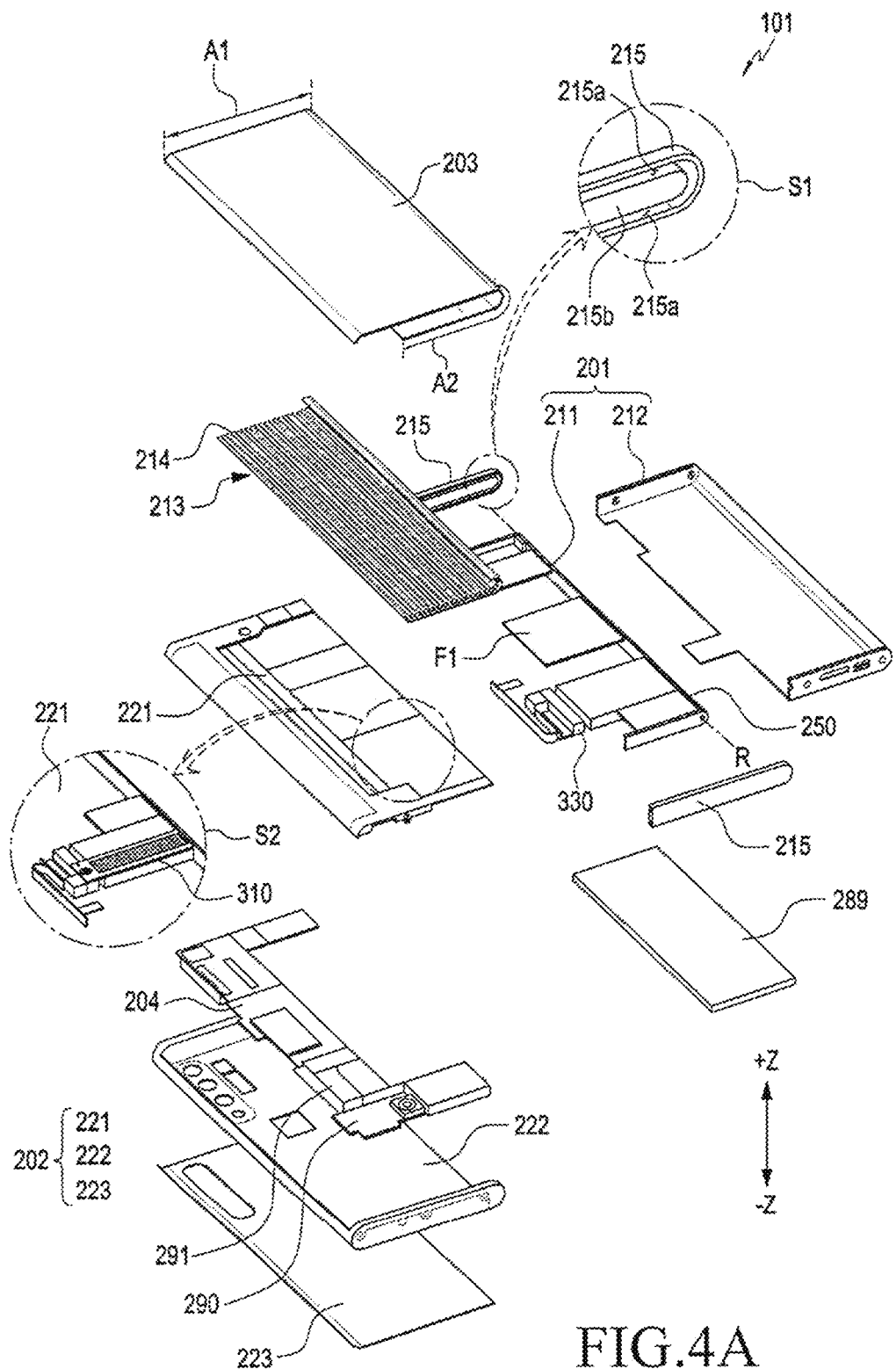
FIGS. 4A and 4B are exploded perspective views of an electronic device according to an embodiment of the disclosure.
Figure 4B:
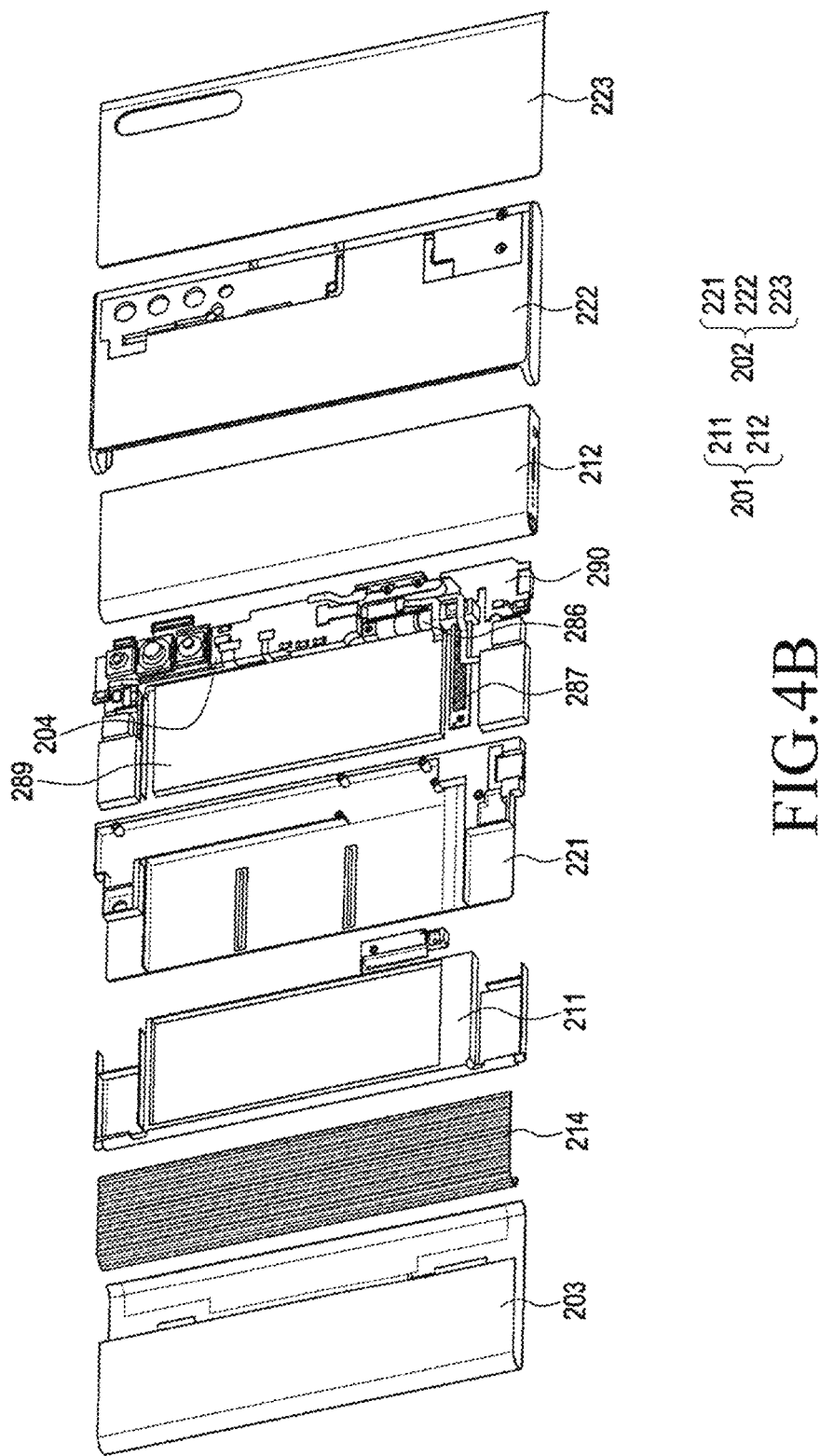

FIGS. 4A and 4B are exploded perspective views of an electronic device according to an embodiment of the disclosure.

Referring to FIGS. 4A and 4B, the electronic device 101 may include a first housing 201, a second housing 202, a display 203 (e.g., flexible display, foldable display, or rollable display), and a support structure 213 (e.g., multi joint hinge structure or multi-bar structure). A portion of the display 203 (e.g., the second display area A2) may be accommodated into the inside of the electronic device 101 along the curved surface 250 of the first housing 201.

The configurations of the first housing 201, the second housing 202, and the display 203 of FIGS. 4A and 4B may be wholly or partly the same as those of the first housing 201, the second housing 202, and the display 203 of FIGS. 2 and 3.

According to an embodiment, the first housing 201 may include a first plate 211 and a slide cover 212. The first plate 211 and the slide cover 212 may be mounted on (e.g., at least partially connected to) the second housing 202 may linearly reciprocate in a direction (e.g., arrow ① direction in FIGS. 2 and 3) while being guided by the second housing 202. According to an embodiment, the first plate 211 may support the display 203. For example, the first plate 211 may include a first surface F1, and the second display area A2 of the display 203 may be substantially disposed on the first surface F1 to be maintained in a flat shape. The slide cover 212 may protect the display 203 located on the first plate 211. For example, at least a portion of the display 203 may be located between the first plate 211 and the slide cover 212. According to an embodiment, the first plate 211 and the slide cover 212 may be made of metal and/or non-metal (e.g., polymer). According to an embodiment, the first plate 211 may accommodate at least some of the components of the electronic device 101 (e.g., a battery 289, a motor structure 286, and a rack 287).

According to an embodiment, the support structure 213 may support the display 203. For example, the support structure 213 may be connected or attached to at least a portion of the display 203 (e.g., the second display area A2). According to an embodiment, the support structure 213 may be located between the first plate 211 and the slide cover 212. According to an embodiment, as the first housing 201 slides, the support structure 213 is movable relative to the second housing 202. In the closed state (e.g., FIG. 2), most of the support structure 213 may be accommodated inside the second housing 202. According to an embodiment, at least a portion of the support structure 213 may move to correspond to the curved surface 250 located at an edge of the first housing 201.

According to an embodiment, the support structure 213 may include a plurality of bars (or a plurality of rods 214). The plurality of bars 214 may be linearly extended and disposed to be parallel to the rotation axis R of the curved surface 250 and may be arranged in a direction perpendicular to the rotation axis R (e.g., the direction in which the first housing 201 slides).

According to an embodiment, the support structure 213 is a monolithic support structure and/or a monolithic support body (e.g., integrated support body) and may include a plate part (such as first plate 211) and a plurality of bars. For example, the plurality of bars of the monolithic support body may be a bar-type protruding parts (e.g., bump parts, or lump parts, which may also be called bar-shaped parts, or plurality of bars 214) ) protruding from one surface of the plate part. The monolithic support body is manufactured through a processing process (eg, a cutting process, an etching process) as one structure, and the plate part and the plurality of bars may be made of the same material.

According to an embodiment, the support structure 213 is a monolithic support structure and/or a monolithic support body (e.g., integrated support body) and may include a plate part and a bar-type parts, protruding parts, bump parts, or lump parts (e.g., a plurality of bars). The monolithic support body may be an integral structure that seamlessly extends from the plate part to the bar-shaped parts. According to one embodiment, the plate part and the bar-shaped parts of the monolithic support body may be formed as a single piece or one body. According to one embodiment, as the plate part and the bar-shaped parts of the monolithic support body are formed by a cutting process, they may not be combined (e.g., bonded with an adhesive material) or assembled after being separated into separate elements. As the plate part and the bar-shaped parts are provided as an integrally formed support structure, space efficiency inside the electronic device may be improved and rigidity of the support structure may be improved.

According to an embodiment, the electronic device 101 may include guide rails 215 capable of guiding the movement of the plurality of bars 214. The guide rails 215 may include an upper end guide rail coupled to the upper end of the first plate 211 and connected to the upper end portions of the plurality of bars 214, and a lower end guide rail coupled to the lower end of the first plate 211 and connected to the lower end portions of the plurality of bars 214. According to an embodiment, referring to the first enlarged area S1, when the plurality of bars 214 are bent or slid while moving on the curved surface 250, the upper end portions and/or the lower end portions of the plurality of bars 214 are movable while maintaining the state of being fitted and coupled to the guide rails 215. For example, the upper end portions and/or the lower end portions of the plurality of bars 214 may slide, in the state of being fitted to groove-shaped rails 215a provided inside the guide rails 215, along the rails 215a.

According to an embodiment, by the driving of the motor structure 286 (e.g., the driving for slide-out of the display), the first plate 211 on which the motor structure 286 is disposed slides out, and a protrusion 215b provided inside each of the guide rails 215 may push the upper end portions and/or the lower end portions of the bent bars 214. Accordingly, the display 203 accommodated between the first plate 211 and the slide cover 212 may be expanded to the front surface. According to an embodiment, by the driving of the motor structure 286 (e.g., the driving for slide-in of the display), the first plate 211 on which the driving motor 286 is disposed slides in, and an outer portion of each guide rail 215 (e.g., the portion other than the protrusion 215b) may push the upper end portions and/or the lower end portions of the bent bars 214. Accordingly, the expanded display 203 may be accommodated between the first plate 211 and the slide cover 212.

According to an embodiment, the rack 287 may be disposed in the second housing 202 and may guide the sliding of the first housing 201 and the display 203. The second enlarged area S2 shows the rear surface (e.g., the surface facing the −Z-axis direction) of the second plate 221. Referring to the second enlarged area S2, the rack 287 is fixedly disposed on one surface (e.g., the surface oriented in the −Z-axis direction) of the second plate 221 of the second housing 202 and may guide a gear connected to the motor structure (or motor) 286 to move in the sliding direction while rotating. According to an embodiment, the rack 287 may be disposed within the first housing 201 and the motor structure 286 may be disposed within the second housing 202. The rack 287 may guide the sliding of the second housing 202 and the display 203. For example, the rack 287 is fixedly disposed on the first plate 211 of the first housing 201 and the motor structure 286 disposed on the second plate 221 of the second housing 202 may slide while rotating with the gear connected to the motor structure 286.

According to an embodiment, the second housing 202 may include the second plate 221, a second plate cover 222, and a third plate 223. The second plate 221 may support the electronic device 101 as a whole. The first plate 211 may be disposed on one surface of the second plate 221, and a printed circuit board 204 may be coupled to the other surface of the second plate 221. According to an embodiment, the second plate 221 may accommodate components of the electronic device 101 (e.g., the battery 289 and the printed circuit board 204). The second plate cover 222 may protect various components located on the second plate 221.

According to an embodiment, a plurality of boards may be accommodated in the second housing 202. On the printed circuit board 204, which is a main board, a processor, a memory, and/or an interface may be mounted. The processor may include at least one of, for example, a central processing unit, an application processor, a graphics processor, an image signal processor, a sensor hub processor, or a communication processor. According to an embodiment, the printed circuit board 204 may include a flexible printed circuit board-type radio frequency cable (FRC). For example, the printed circuit board 204 may be disposed in at least a portion of the second plate 221 and may be electrically connected to an antenna module and a communication module.

According to an embodiment, the memory may include, for example, a volatile memory or a nonvolatile memory.

According to an embodiment, the interface may include, for example, a high-definition multimedia interface (HDMI), a universal serial bus (USB) interface, an SD card interface, and/or an audio interface. For example, the interface may electrically or physically connect the electronic device 101 to an external electronic device may include a USB connector, an SD card/MMC connector, or an audio connector.

According to an embodiment, the electronic device 101 may further include a separate sub-circuit board 290 spaced apart from the printed circuit board 240 in the second housing 202. The sub-circuit board 290 may be electrically connected to the printed circuit board 240 via a flexible connection board 291. The sub-circuit board 290 may be electrically connected to the battery 289 or electrical components disposed in an end area of the electronic device 101, such as a speaker and/or a SIM socket, to transmit signals and power.

According to an embodiment, the battery 289 is a device for supplying power to at least one component of the electronic device 101 and may include, for example, a non-rechargeable primary battery, a rechargeable secondary battery, or a fuel cell. At least a portion of the battery 289 may be disposed on substantially the same plane as, for example, the printed circuit board 204. The battery 289 may be integrally disposed inside the electronic device 101 or may be detachably disposed on the electronic device 101.

According to an embodiment, the battery 289 may be configured as a single integrated battery or may include a plurality of separable batteries. For example, when the integrated battery is located on the first plate 211, the battery may move along with the sliding of the first plate 211.

According to an embodiment, the third plate 223 may substantially define at least a portion of the exterior of the second housing 202 or the electronic device 101. For example, the third plate 223 may be coupled to the outer surface of the second plate cover 222. According to an embodiment, the third plate 223 may be integrated with the second plate cover 222. According to an embodiment, the third plate 223 may provide a decorative effect on the exterior of the electronic device 101. The second plate 221 and the second plate cover 222 may be manufactured by using at least one of metal or polymer, and the third plate 223 may be manufactured by using at least one of metal, glass, synthetic resin, or ceramic. According to an embodiment, the second plate 221, the second plate cover 222, and/or the third plate 223 may be made of a material that transmits light at least partially (e.g., in an auxiliary display area). For example, in the state in which a portion of the display 203 (e.g., the second display area A2) is accommodated in the inside of the electronic device 101, the electronic device 101 may output visual information by using the second display area A2. The auxiliary display area may be a portion of the second plate 221, the second plate cover 222 and/or the third plate 223 in which the display 203 accommodated in the inside of the second housing 202 is located.

Figure 5A:
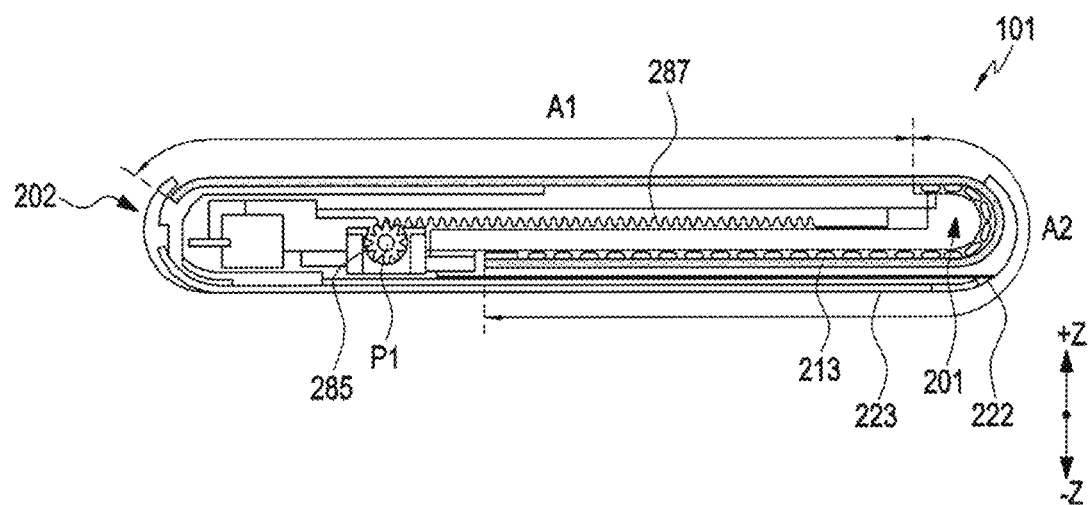
FIG. 5A is a cross-sectional view illustrating associated components of the rack and the gear connected to the motor in the state in which the electronic device according to an embodiment of the disclosure is closed.
Figure 5B:
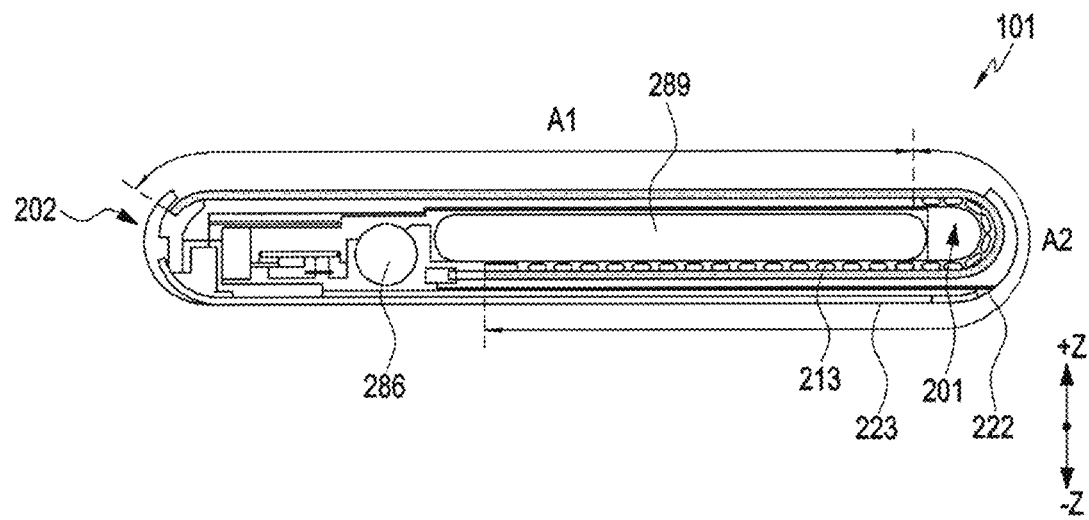
FIG. 5B is a cross-sectional view illustrating an arrangement relationship of the motor and the battery in the state in which the electronic device according to an embodiment of the disclosure is closed.

FIG. 5A is a cross-sectional view illustrating associated components of the rack and the gear connected to the motor in the state in which the electronic device according to an embodiment of the disclosure is closed. FIG. 5B is a cross-sectional view illustrating an arrangement relationship of the motor and the battery in the state in which the electronic device according to an embodiment of the disclosure is closed. FIG. 6A is a cross-sectional view illustrating associated components of the rack and the gear connected to the motor in the state in which the electronic device according to an embodiment of the disclosure is opened. FIG. 6B is a cross-sectional view illustrating an arrangement relationship of the motor and the battery in the state in which the electronic device according to an embodiment of the disclosure is opened.

According to an embodiment, the electronic device 101 may include a first housing 201, a second housing 202, a display 203, and a driving structure (e.g., the rack 287 and the motor structure 286). The electronic device 101 may further include various components (e.g., a camera module and a battery) disposed in the first housing 201 or the second housing 202.

The configurations of the first housing 201 and the second housing 202 of FIGS. 5A to 6B may be wholly or partly the same as those of the first housing 201 and the second housing 202 of FIGS. 2A to 4B.

According to an embodiment, depending on whether the first housing 201 (and the flexible display 203 connected to the first housing 201) slides in or slides out relative to the second housing 202, the electronic device may be in the closed state or the opened state.

According to an embodiment, the electronic device 101 may include a driving structure for automatically or semi-automatically implementing the slide-in/out operation of the display 203. For example, when a user pushes an open trigger button (e.g., the key input device 241 of FIG. 2) exposed to the outside of the electronic device 101, the display 203 may automatically slide in or slide out (automatic operation). As another example, when the user pushes the display 203 of the electronic device 101 to slide out up to a predetermined section, the remaining section may completely slid out by the force of an elastic member mounted in the electronic device 101 (semi-automatic operation). The slide-in operation of the electronic device 101 may also be performed to correspond to the slide-out operation (semi-automatic operation).

According to an embodiment, the driving structure may include a motor structure 286, a gear 285 mounted at an end of the motor structure 286, a rack 287, and a sub-circuit board (not illustrated) electrically connected to the motor structure 286. According to an embodiment, the gear 285 may be a pinion gear. According to an embodiment, the rack 287 may mesh with the gear 285. For example, the gear 285 rotates based on the rotation of the motor structure 286, and the rack 287 may receive at least a portion of the driving force generated by the motor structure 286 via the gear 285.

According to an embodiment, the motor structure 286 may be disposed in the first housing 201 to be slidable relative to the second housing 202. The motor structure 286 may transmit a driving force to the gear 285 connected to the end thereof.

According to an embodiment, the motor structure 286 may be disposed not to overlap the second display area A2 of the display 203. For example, the shaft P1 of the motor structure 286 may be disposed to be perpendicular to the sliding direction, and one surface of the motor structure 286 facing the +Z-axis direction overlaps the first display area A1, but one surface facing the −Z-axis direction may be disposed not to overlap the second display area A2 regardless of the slide-in and the slide-out of the display 203. The one surface of the driving motor 286 facing the −Z axis direction may face the first housing 201 in the slide-in state of the display 203 may face the second housing 202 in the slide-out state of the display 203. According to an embodiment, the motor structure 286 may be disposed in parallel with at least a portion of the battery 289 and may be electrically connected to the sub-circuit board disposed adjacent thereto.

According to an embodiment, the rack 287 may be disposed in the second housing 202 and may guide the sliding of the first housing 201 and the display 203. The rack 287 may be fixedly disposed on one surface (e.g., the one surface facing the −Z-axis direction) of the second plate 221 of the second housing 202 and may guide the gear 285 to be movable in the sliding direction to move while rotating. At least a portion of the one surface of the rack 287 facing the −Z-axis direction may face the second display area A2 in the slide-in state of the display 203 may not face the second display area A2 in the slide-out state of the display 203. According to an embodiment, the rack 287 may be disposed not to overlap the battery 289. For example, when separable batteries are disposed in the electronic device 101 and are viewed toward the rear surface, a rack 287 may be located between the batteries.

According to an embodiment, the gear 285 may be located on the shaft P1 of the motor structure 286 and may cause the first housing 201 and the display 203 to slide while rotating and moving along the rack 287. When the first housing 201 slides due to rotation of the gear 285, an electrical component (hereinafter, referred to as a first electrical component) disposed in the first housing 201 may also slide. For example, the first electrical component may be at least one of the motor structure 286, components disposed on the sub-circuit board 290, a speaker, or a SIM socket. As another example, the first electrical component may be the battery 289. In the case of separable batteries, the battery 289 may be at least one of the separable batteries.

According to an embodiment, the sub-circuit board may be disposed adjacent to the motor structure 286 and/or the rack 287 in the first housing 201. The sub-circuit board 290 may be configured to be electrically connected to the main circuit board (e.g., the printed circuit board 204 of FIG. 4A) disposed in the second housing 202. The main circuit board may accommodate an electrical structure (e.g., a processor) to control driving of the motor structure 286 or to provide power to the motor structure 286. The sub-circuit board may be electrically connected to the main circuit board 204 to transmit signals for controlling driving of the motor structure 286 or for controlling power. According to an embodiment, the sub-circuit board and the main circuit board 204 may be rigid boards, and the electronic device 101 further include a separate connection flexible printed circuit board (FPCB) for interconnecting the sub-circuit board and the main circuit board 204. According to an embodiment, power from the battery 289 disposed adjacent to the motor structure 286 may directly provide power via the sub-circuit board.

Figure 7:
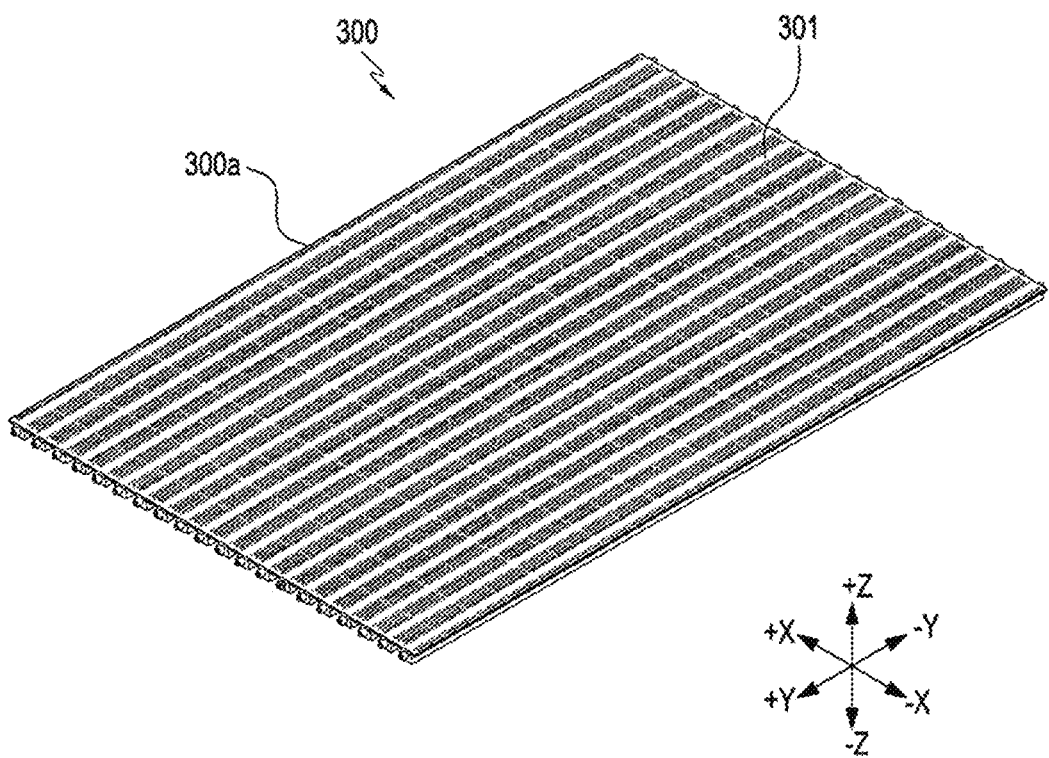
FIG. 7 is a perspective view illustrating the front surface of a lattice module according to an embodiment.
Figure 8:
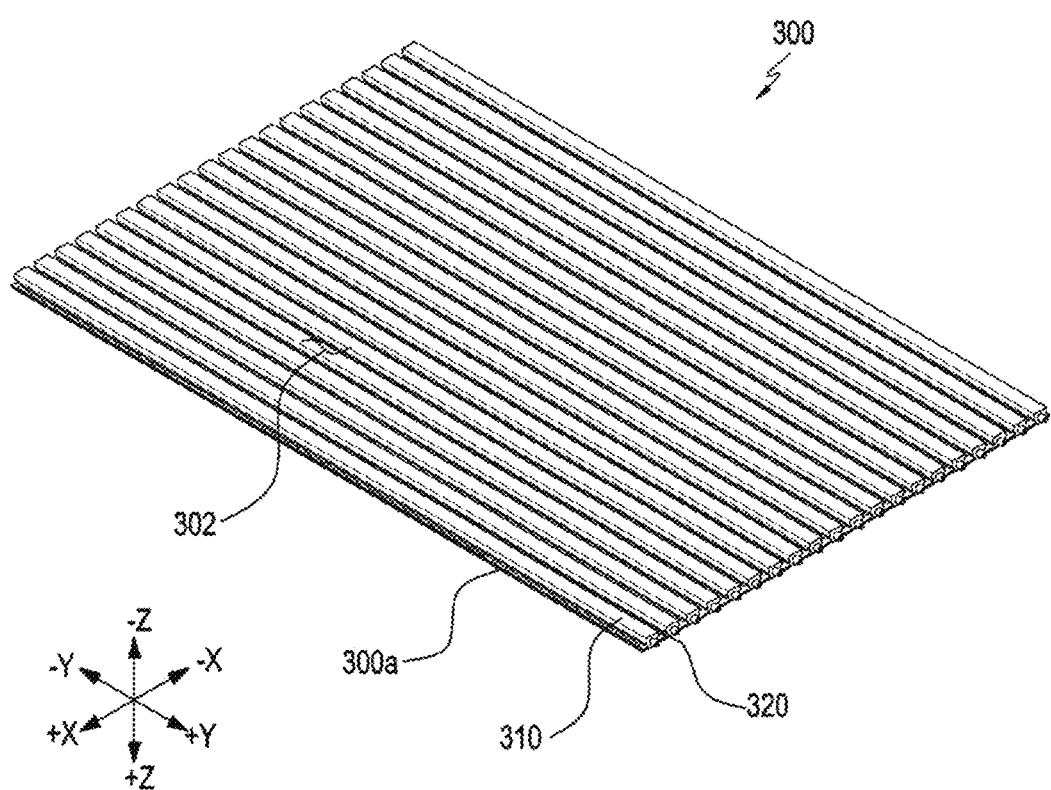
FIG. 8 is a perspective view illustrating the rear surface of the lattice module according to an embodiment.
Figure 9:
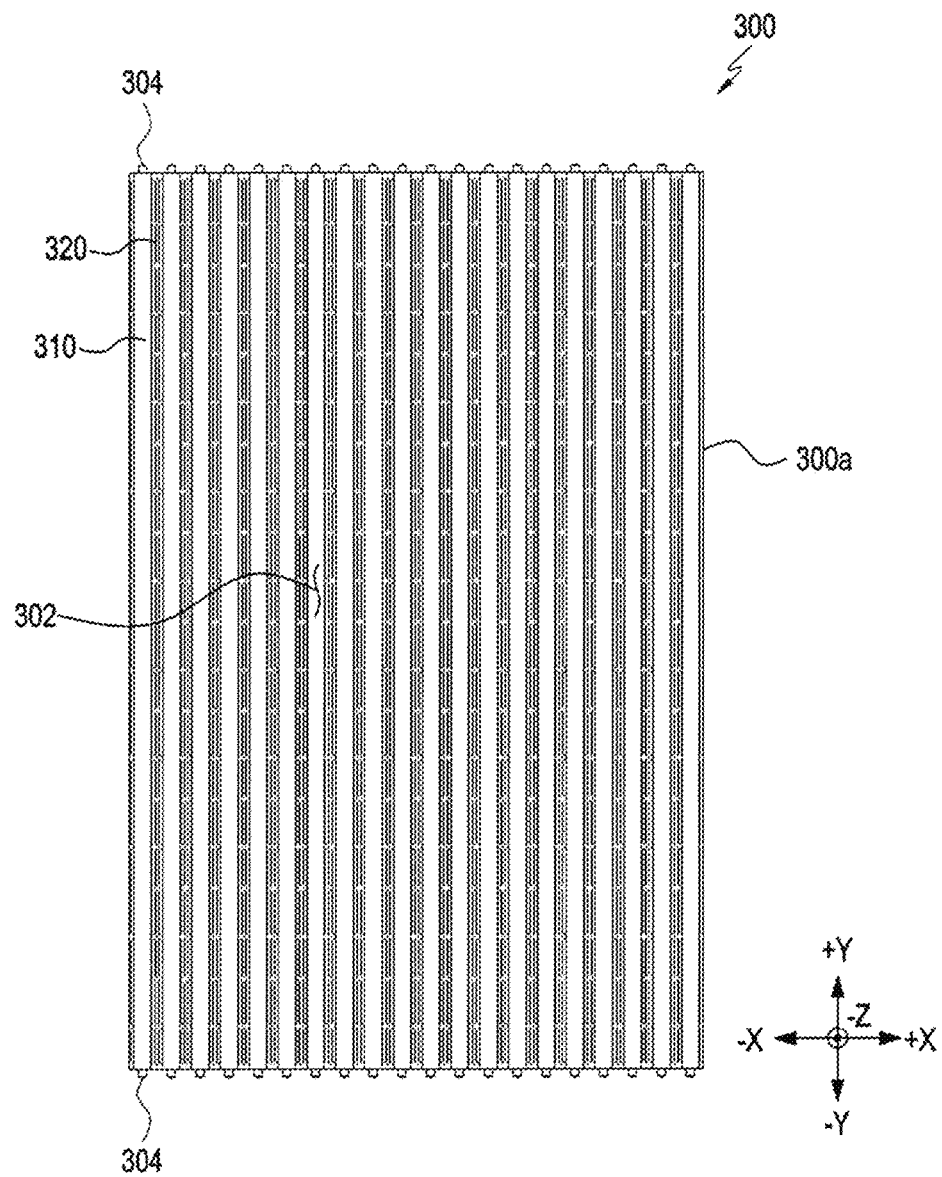
FIG. 9 is a rear view of the lattice module according to an embodiment.
Figure 10:
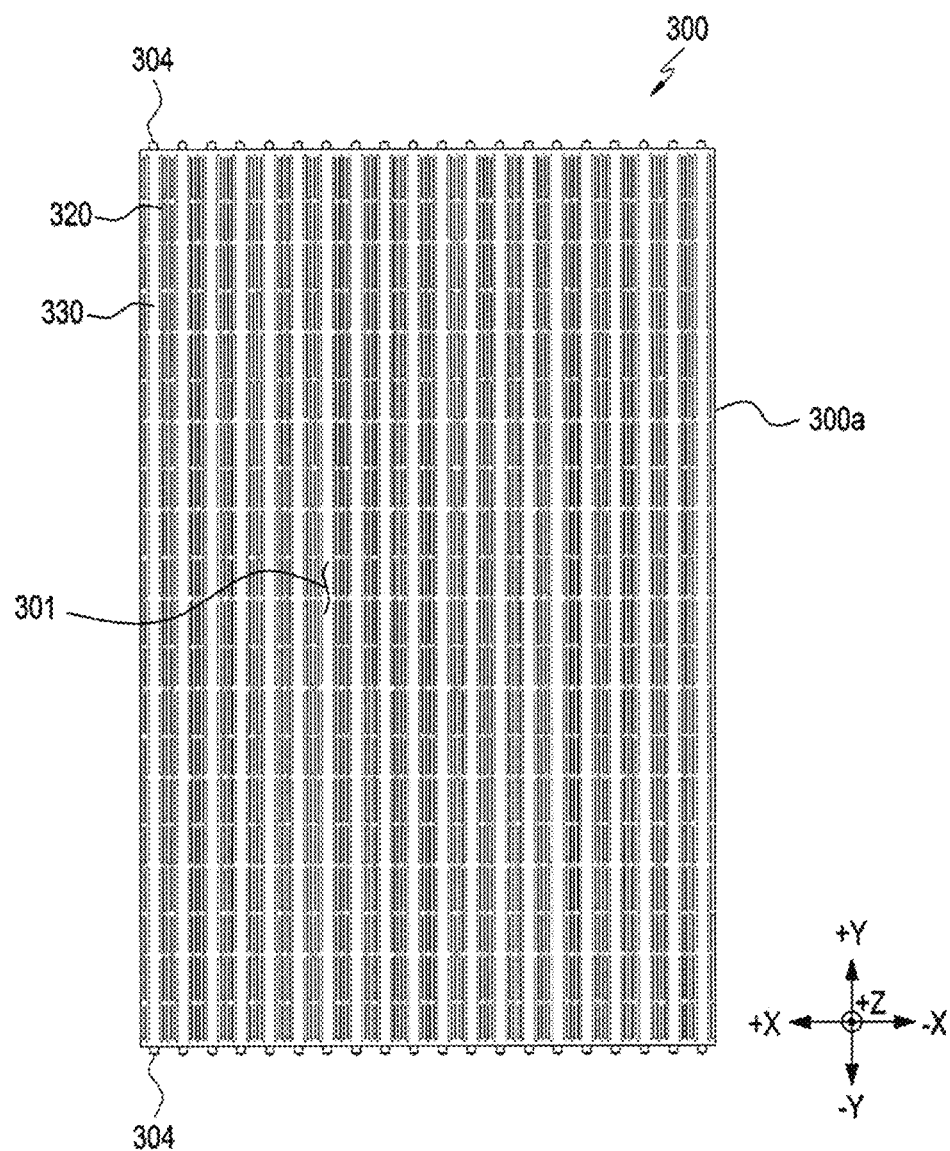
FIG. 10 is a top view of the lattice module according to an embodiment.

FIG. 7 is a perspective view illustrating the front surface of a lattice module according to an embodiment. FIG. 8 is a perspective view illustrating the rear surface of the lattice module according to an embodiment. FIG. 9 is a rear view of the lattice module according to an embodiment. FIG. 10 is a top view of the lattice module according to an embodiment.

Referring to FIGS. 7 to 10, the lattice module 300 according to an embodiment may include a plate 300a (e.g., plate part 310a) and a plurality of bars 310 (e.g., the plurality of bars 214 of FIG. 4A) disposed on one side (the −Z axis direction) of the plate 300a. For example, the lattice module 300 is a monolithic support body (which was also previously referred to as the monolithic support structure 213), , the plurality of bars 310 may be bar-type protruding parts (e.g., bump parts, or lump parts) that extend and/or protrude from one surface of the plate 300a. In an embodiment, the plate 300a may include a first surface 301 facing a first direction (the +Z-axis direction) and a second surface 302 facing a second direction opposite to the first surface 301 and opposite to the first direction (the −Z-axis direction). The description of the support structure 213 (e.g., the multi-bar structure) described above with reference to FIGS. 2 to 6 may be applied to the lattice module 300 of FIGS. 7 to 10.

According to an embodiment, the first surface 301 of the lattice module 300 may support a display (e.g., the display 203 of FIGS. 2 and 3) as described above. In an embodiment, the lattice module 300 may be made of a stretchable and flexible material in order to operate while supporting the display 203. In addition, the lattice module 300 may also include metal.

According to an embodiment, the plurality of bars 310 may be disposed or protruded from the second surface 302 of the lattice module 300. The plurality of bars 310 may be disposed or protruded from the second surface 302 at designated intervals from each other. In an embodiment, a lattice area 320 (e.g., a first area) may be provided between every two adjacent ones of the bars 310. For example, the lattice area 320 may refer to openings formed in the lattice module 300 and/or areas adjacent to the openings located between two adjacent bars 310. According to one embodiment, the lattice module 300 may include a plurality of support areas 330 on the first surface 301. The support area 330 may be alternately disposed with the lattice area 320 on the first surface 301. In an embodiment, the lattice areas 320 may each include an opening extending from the first surface 301 to the second surface 302.

According to an embodiment, the lattice module 300 may include protrusions 304 protruding in the longitudinal direction (the y-axis direction). In an embodiment, the protruding portions 304 may protrude to a first longitudinal direction (the +y-axis direction) and/or may protrude a second longitudinal direction (the −y-axis direction). In an embodiment, the protrusions 304 may be operatively connected to a portion of an electronic device (e.g., the electronic device 101 of FIG. 2). For example, the protrusions 304 may be connected to at least a portion of a housing (e.g., the housings 201 and 202 of FIG. 4A). The protrusions 304 may be connected to and operated with a guide rail (e.g., the guide rails 215 of FIG. 4A).

According to an embodiment, the lattice module 300 may be integrally configured. For example, all or some of the plate 300a, the plurality of bars 310, the plurality of protrusions 304, and the plurality of lattice areas 320 may be integrated together as a single component. For example, the lattice module 300 may be configured by performing various machining processes on a lattice material (e.g., the lattice material 500 of FIG. 16). A process of manufacturing the lattice module 300 will be described in detail below.

Figure 11:
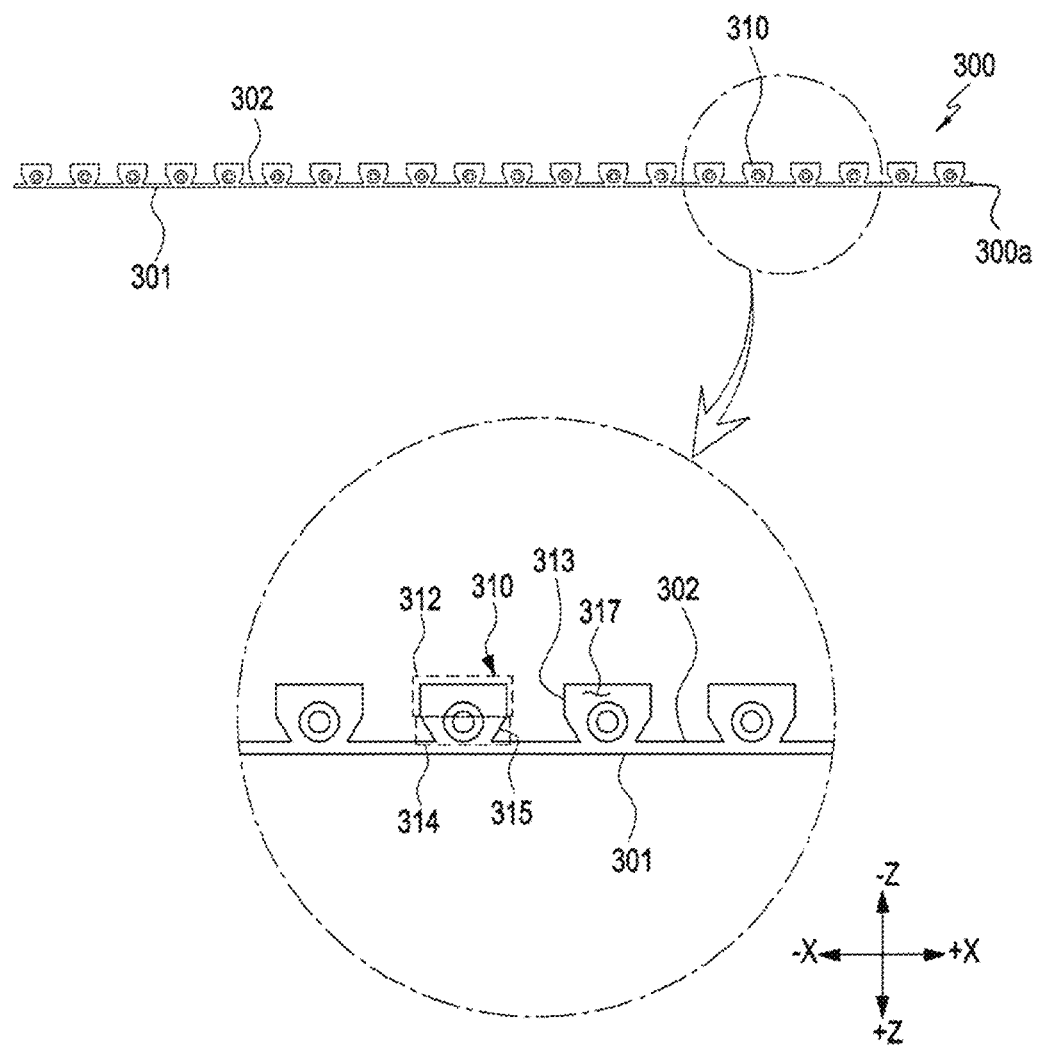
FIG. 11 is a side view of the lattice module according to an embodiment.
Figure 12:
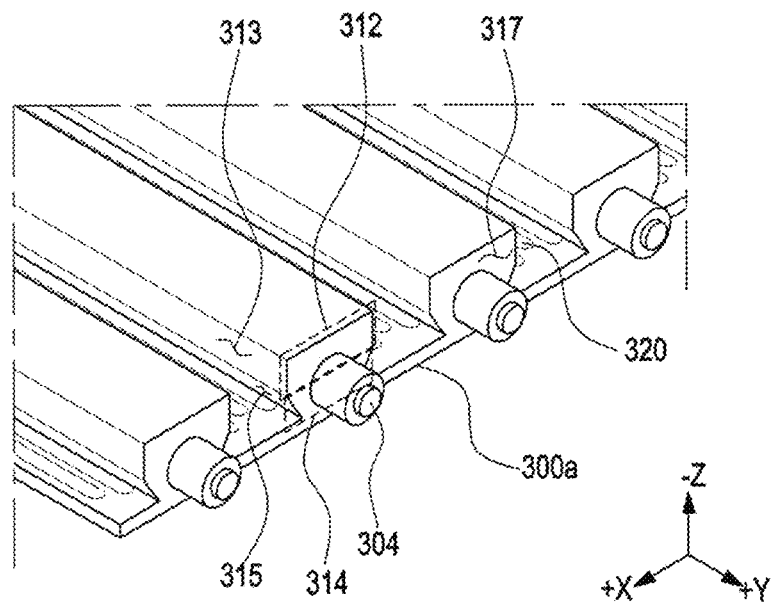
FIG. 12 is an enlarged view of a portion of the lattice module according to an embodiment.
Figure 13:
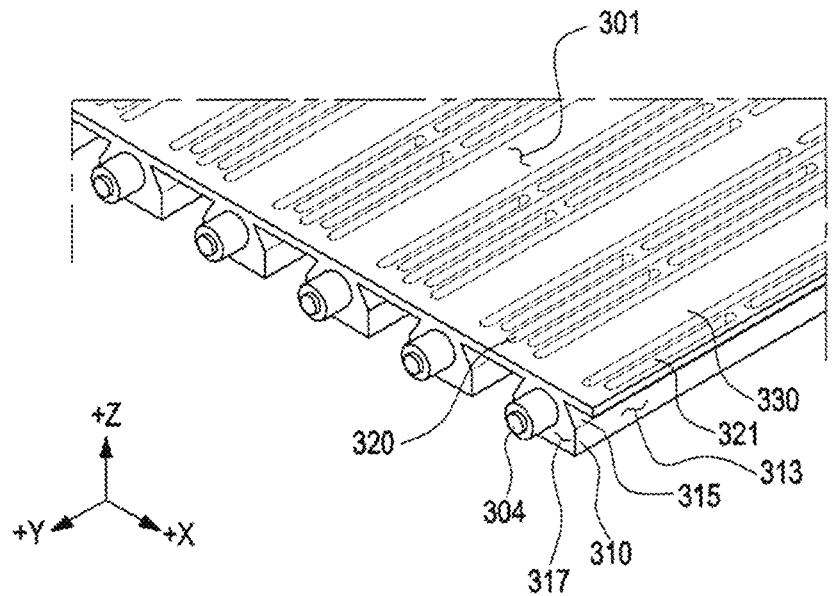
FIG. 13 is an enlarged view of another portion of the lattice module according to an embodiment.

FIG. 11 is a side view of the lattice module according to an embodiment. FIG. 12 is an enlarged view of a portion of the lattice module according to an embodiment. FIG. 13 is an enlarged view of another portion of the lattice module according to an embodiment.

Referring to FIGS. 11 to 13, the plurality of bars 310 may each include a first area 312 (or a first portion) and a second area 314 (or a second portion) having different shapes. For example, the second area 314 may refer to a partial area (or a partial portion) of each of the plurality of bars 310 adjacent to the second surface 302 of the lattice module 300 (or the plate 300a), and the first area 312 may refer to another partial area (or a partial portion) of each of the plurality of bars 310 extending from the second area 314 in a perpendicular direction (the −Z-axis direction). In other words, the first area 312 refers to at least one area of each of the plurality of bars 310 in the first direction (the −Z-axis direction), and the second area 314 refers to another partial area of each of the plurality of bars 310 in the second direction (the +Z axis direction) opposite to the first direction (the −Z-axis direction). The description of the lattice module 300 of FIGS. 7 to 10 may be applied to the lattice module 300 of FIGS. 11 to 13.

According to an embodiment, the first area 312 and the second area 314 may have different widths in the short side direction (the x-axis direction) of the lattice module 300. For example, the width of the first area 312 may be greater than that of the second area 314. Since the width of the first area 312 is greater than that of the second area 314, the shape of the plurality of bars 310 may be described as having a dovetail shape.

In some embodiments, the second area 314 may extend from at least a portion of the second surface 302. For example, the second area 314 may include an inclined surface 315 extending while forming a predetermined angle with the second surface 302. The predetermined angle a may be less than 90 degrees, and the width of the second area 314 may be smaller than that of the first area 312. In an embodiment, the first area 312 may extend from the second area 314. For example, the first area 312 may include an extension surface 313 extending from the inclined surface 315. For example, the extension surface 313 may form a substantially 90-degree angle with the second surface 302 but is not limited thereto. Since the width of the second areas 314 is smaller than that of the first areas 312, the rigidity of the lattice module 300 may be maintained even when the lattice module 300 is bent in the state of supporting the display (e.g., the display 203 of FIGS. 2 and 3).

According to an embodiment, the lattice areas 320 may be provided between every two adjacent ones of the second areas 314 of the plurality of bars 310. In an embodiment, the first surface 301 of the lattice module 300 may consist of at least a portion of support areas 330. In other words, the support areas 330 may refer to portions of the first surface 301 facing the second areas 314 of the plurality of bars 310. For example, on the first surface 301, the support areas 330 and the lattice areas 320 may be alternately disposed.

In some embodiments, a plurality of openings provided in each lattice area 320 may be observed in different shapes when the lattice module 300 is observed from the first direction (the −z-axis direction) and when the lattice module 300 is observed from the second direction (the +z-axis direction). For example, since the plurality of bars 310 have a dovetail shape as described, when the lattice module 300 is observed from above the second surface 302 on which the plurality of bars 310 are provided, the lattice areas 320 may be at least partially covered by the first areas 312. In contrast, when the lattice module 300 is observed from above the first surface 301, the lattice areas 320 may be observed without covered portions.

In some embodiments, the lattice module 300 may include an auxiliary lattice area 321 disposed on an edge area in the short side direction (the x-axis direction). The auxiliary lattice area 321 may have a width smaller than that of the lattice areas 320 in the short side direction (the x-axis direction) but is not limited thereto. For example, the number of openings provided in the auxiliary lattice area 321 may be less than the number of openings formed in each lattice area 320.

In some embodiments, a protrusion 304 may extend from each of plurality of bars 310. For example, the protrusions 304 may each be provided to extend from one surface 317 of each of the plurality of bars 310 in the longitudinal direction (the y-axis direction). As described above, the protrusions 304 may protrude to both or one of the first longitudinal direction (the +y-axis directions) and/or the second longitudinal direction (the −y-axis direction) of the plurality of bars 310.

Hereinafter, a process of manufacturing the above-described lattice module 300 will be described.

Figure 14:
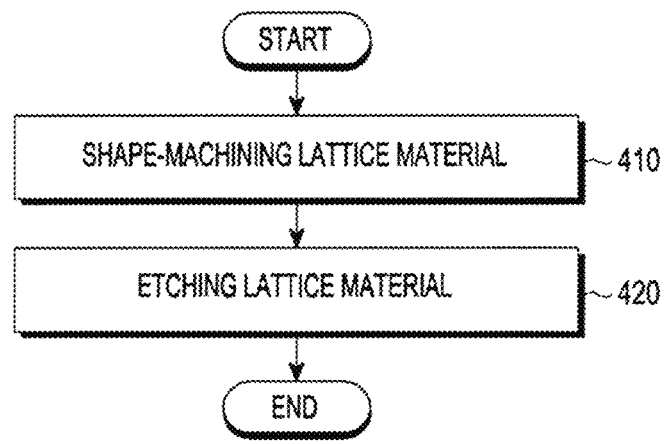
FIG. 14 is a flowchart schematically illustrating a process of manufacturing a lattice module according to an embodiment.

FIG. 14 is a flowchart schematically illustrating a process of manufacturing a lattice module according to an embodiment.

Referring to FIG. 14, the process of manufacturing the lattice module 300 may include a process of shape-machining the lattice material (or support material) (410) and a process of etching the shape-machined lattice material (or support material) (420).

According to an embodiment, in the process of shape-machining the lattice material (410), the plurality of bars 310 and/or the plurality of protrusions 304 described above may be provided. For example, the plurality of bars 310 and/or the plurality of protrusions 304 may be provided by cutting a lattice material (e.g., the lattice material 500 of FIG. 16).

According to an embodiment, in the process of etching the lattice material (420), lattice areas 320 may be provided. However, this is exemplary, and the lattice areas 320 may be provided through a cutting process. In addition, as will be described later, a reinforcement area (e.g., the reinforcement area 650 of FIG. 23) and auxiliary areas (e.g., the auxiliary areas 640 of FIG. 21) of the lattice material 500 are provided through the etching process (420).

Hereinafter, a process of shape-machining the lattice module 300 will be described with reference to the drawings.

Figure 15:
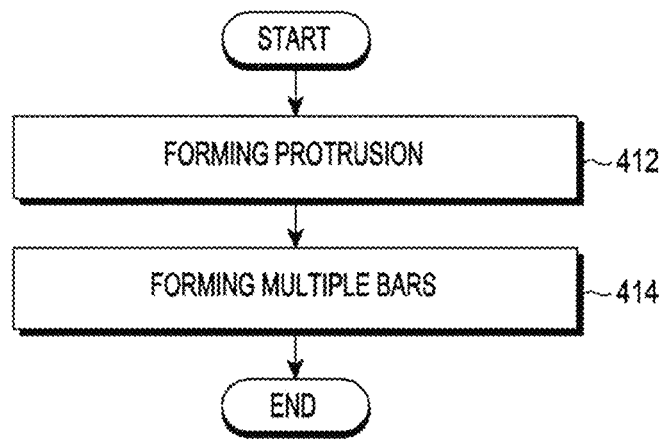
FIG. 15 is a flowchart illustrating a process of shape-machining a lattice module according to an embodiment.
Figure 16:
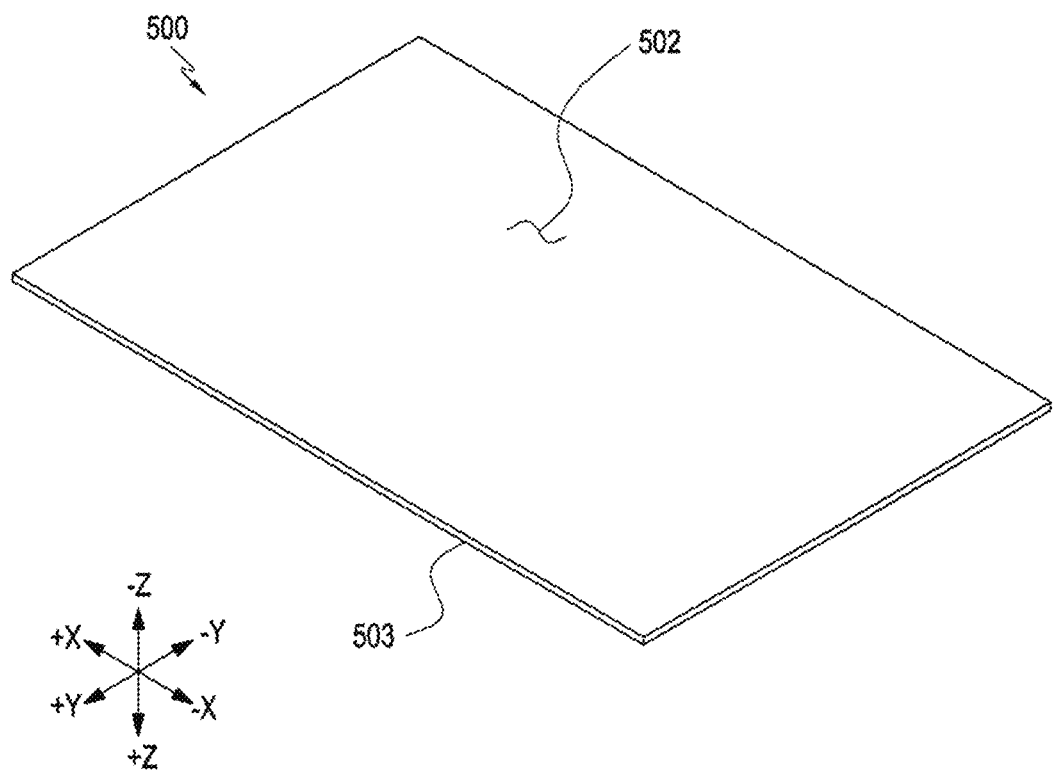
FIG. 16 is a view illustrating a plate according to an embodiment.
Figure 17:
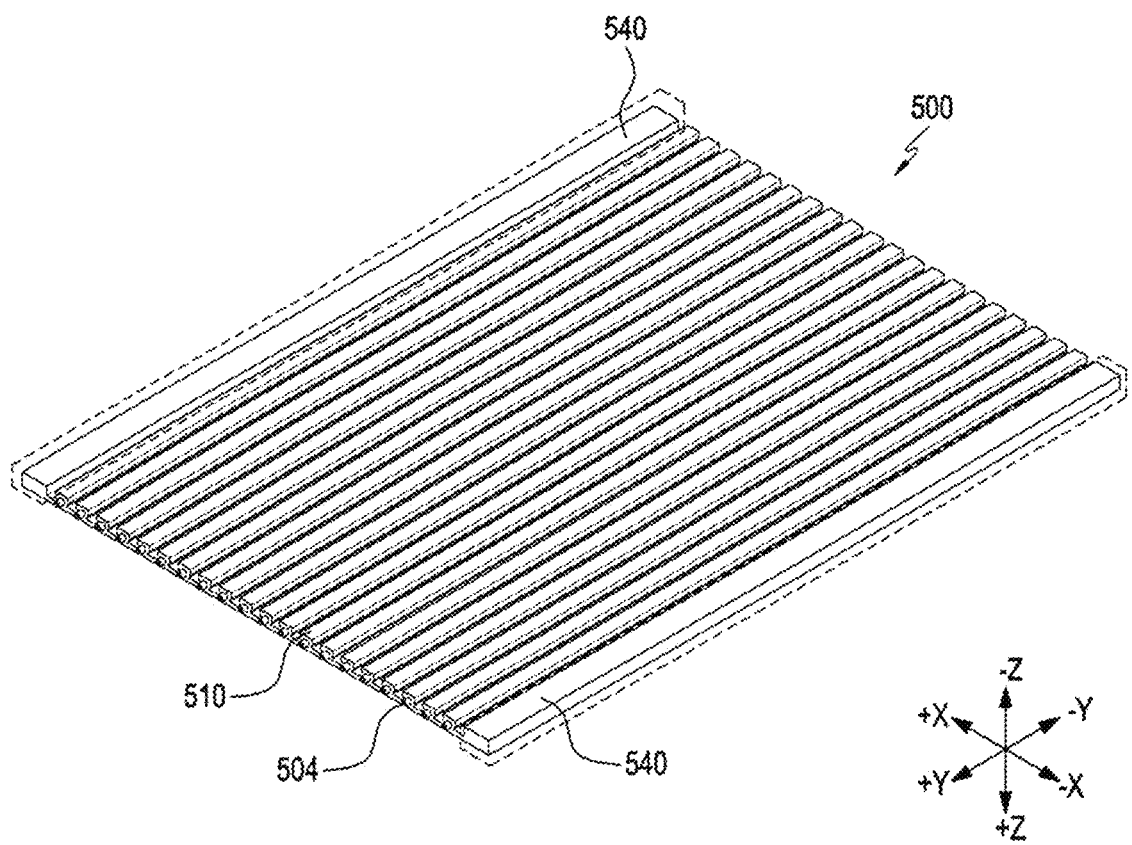
FIG. 17 is a view illustrating a lattice module which is at least partially shape-machined according to an embodiment.
Figure 18:
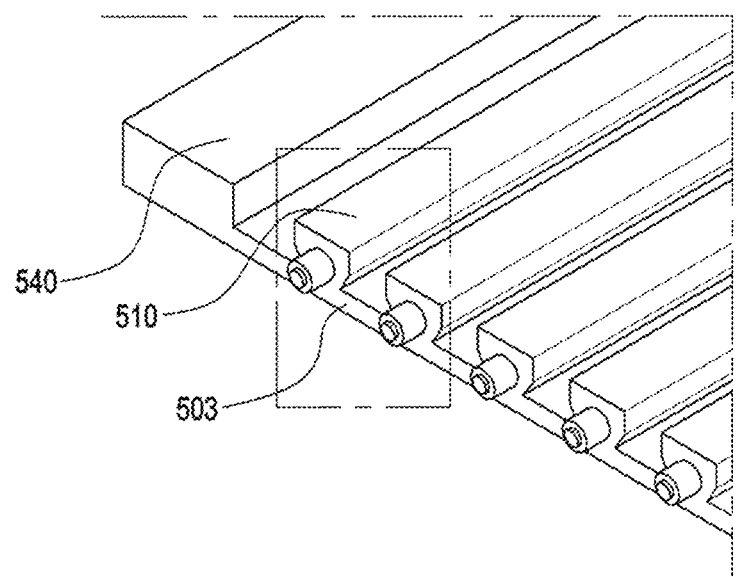
FIG. 18 is a view illustrating shape-machined protrusions according to an embodiment.
Figure 19:
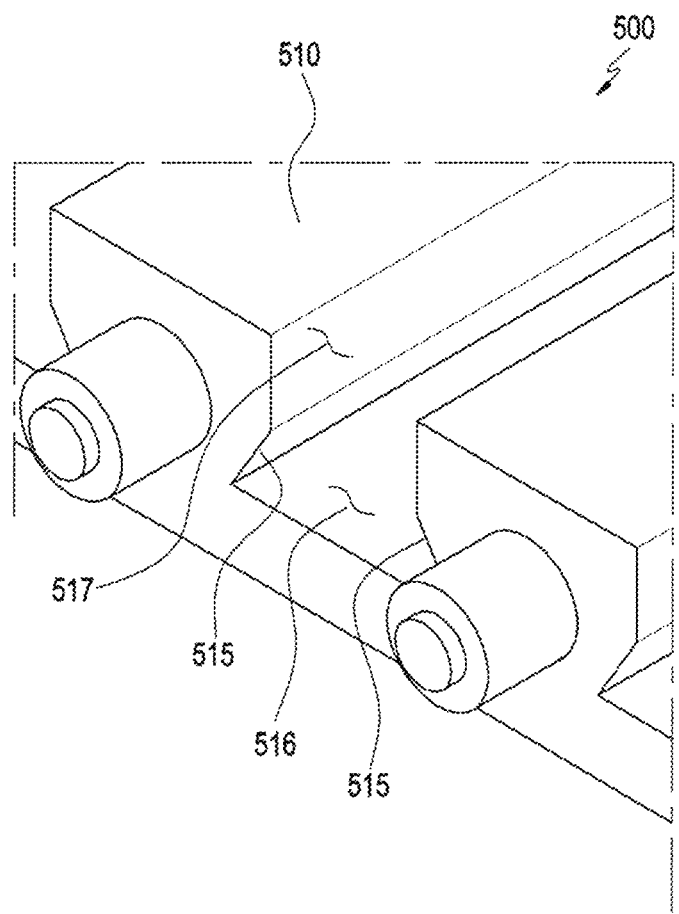
FIG. 19 is an enlarged view of the protrusions of FIG. 18.

FIG. 15 is a flowchart illustrating a process of shape-machining a lattice module according to an embodiment. FIG. 16 is a view illustrating a plate according to an embodiment. FIG. 17 is a view illustrating a lattice module which is at least partially shape-machined according to an embodiment. FIG. 18 is a view illustrating shape-machined protrusions according to an embodiment. FIG. 19 is an enlarged view of the protrusions of FIG. 18.

Referring to FIGS. 15 to 19, the process of shape-machining the lattice module 300 may include a protrusion forming process (412) and a lattice module (e.g., the lattice module 300 of FIG. 7) (or a multi-bar) forming process (414).

According to an embodiment (see FIGS. 15 and 16), the lattice material 500 may be machined into a lattice module (e.g., the lattice module 300 of FIG. 7). In some embodiments, the lattice material 500 may initially have a plate shape. Accordingly, the lattice material 500 may be referred to as a lattice plate.

According to an embodiment, a plurality of bars 510 may be formed by machining the second surface 502 of the lattice material 500. For example, at least a portion of the second surface 502 of the lattice material 500 may be cut or sheared to form a plurality of bars 510.

According to an embodiment, a plurality of protrusions 504 may be formed by machining a side surface 503 of the lattice material 500. For example, at least a portion of the side surface 503 of the lattice material 500 may be cut or sheared to form the plurality of protrusions 504. For example, the side surface 503 may be a surface connecting the second surface 502 and a first surface (not shown) that is opposite to the second surface 502.

In the above and below descriptions, in describing a manufacturing process related to the shape of a lattice module (e.g., the lattice module 300 of FIG. 7), the cutting process and/or the shearing process will be mainly described, but the spirit of the disclosure is not limited thereto. The process of shape-machining the above-described lattice module may be performed through a firing process or a rolling process.

According to an embodiment, the lattice material 500 may include an auxiliary area 540. In an embodiment, the auxiliary area 540 may refer to a partial area of one or both edges of the lattice material 500 in a short side direction (the x-axis direction). As described above, the lattice material 500 is machined to form a lattice module (e.g., the lattice module 300 in FIG. 7) in which the plurality of bars 510 and the plurality of protrusions 504 are integrally formed, and the auxiliary area 540 may be provided as an area where the lattice material 500 can be supported within manufacturing equipment during the manufacturing process.

According to an embodiment (see FIGS. 18 and 19), some portions of the surface of the shape-machined lattice material 500 may have a pattern. In an embodiment, some portions of the surface of the second surface 502 cut to form the plurality of bars 510 may have a pattern shape. For example, in each of the side surfaces 517 of the plurality of cut bars 510, the surfaces 516 between the plurality of bars 510, and the inclined surfaces 515 of the plurality of bars 510, a wavy pattern or a burr may be formed due to the cutting process. Similarly, a wavy pattern or a burr may also be formed on some portions of the surface of the side surface 503, which are cut to form the plurality of protrusions 504, due to the cutting process. According to an embodiment, burr may refer to shape of surface generated in the process of cutting and/or grinding metal (e.g., iron, stainless steel, and/or aluminum). For example, when metal is cut and/or ground for hole machining or surface machining, burr may refer to a structure in which an edge of the metal protrudes or an end of a cut portion is curled.

In some embodiments, a pattern having a predetermined direction may be formed on some portions of the surface of the shape-machined lattice material 500. For example, when shape-machining (e.g., cutting) is performed, a cutting tool (milling tool) is moved along a predetermined direction on some portions of the surface of the lattice material 500, and a pattern corresponding to the moving direction of the cutting tool may be formed on the surface of the lattice material 500. A directional pattern formed on the surface of the lattice material 500 may appear as a wavy pattern (e.g., FIG. 30A), a circle, and/or a straight line (e.g., FIG. 30B). In addition, a pattern having predetermined directionalities in various shapes may be formed on the surface of the lattice material 500.

Hereinafter, an etching process to be performed on the shape-machined lattice material 500 will be described with reference to the drawings.

Figure 20:
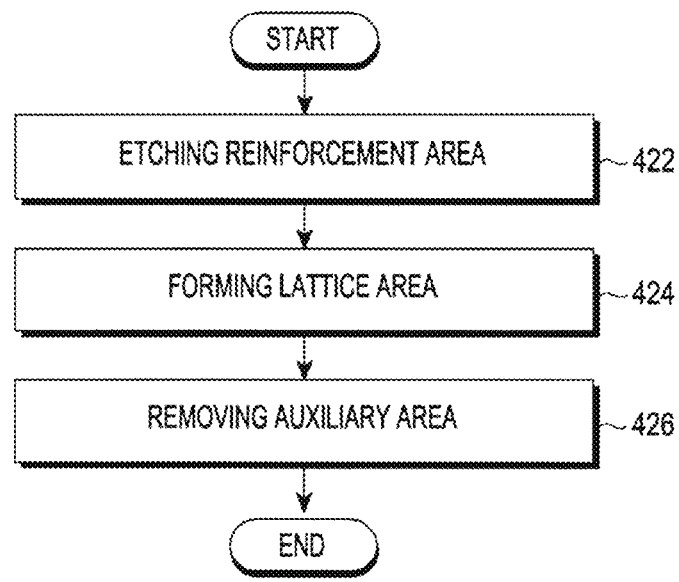
FIG. 20 is a view schematically illustrating a process of etching a lattice module according to an embodiment.
Figure 21:
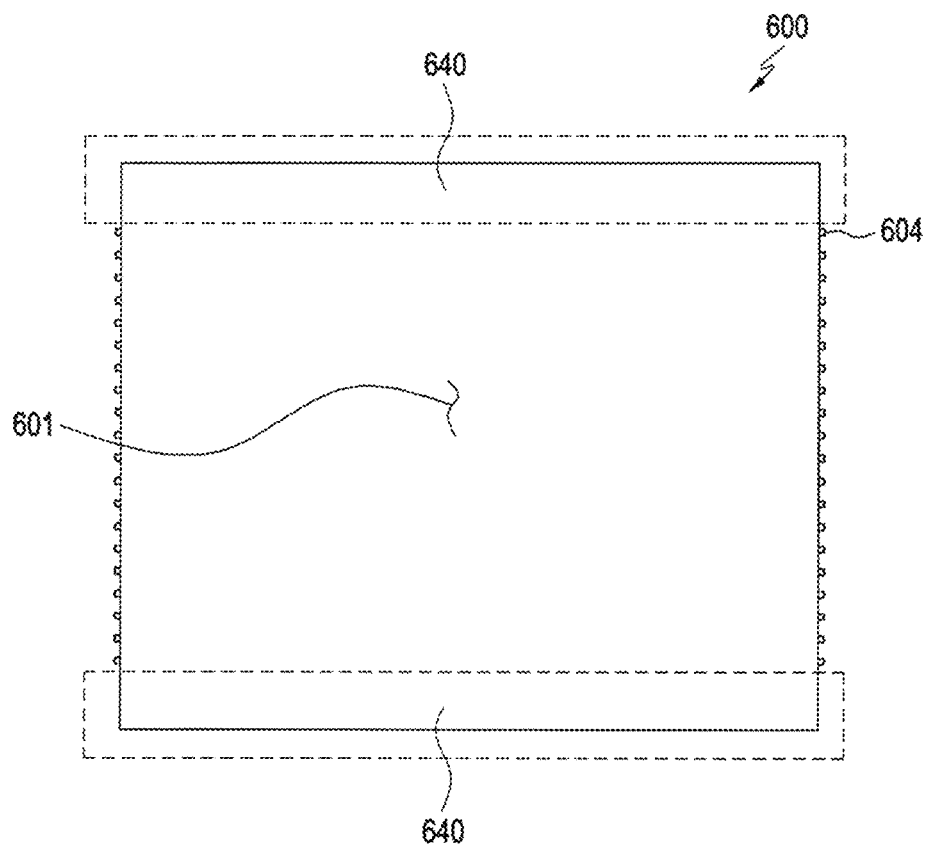
FIG. 21 is a view illustrating a shape-machined lattice module according to an embodiment.
Figure 22:
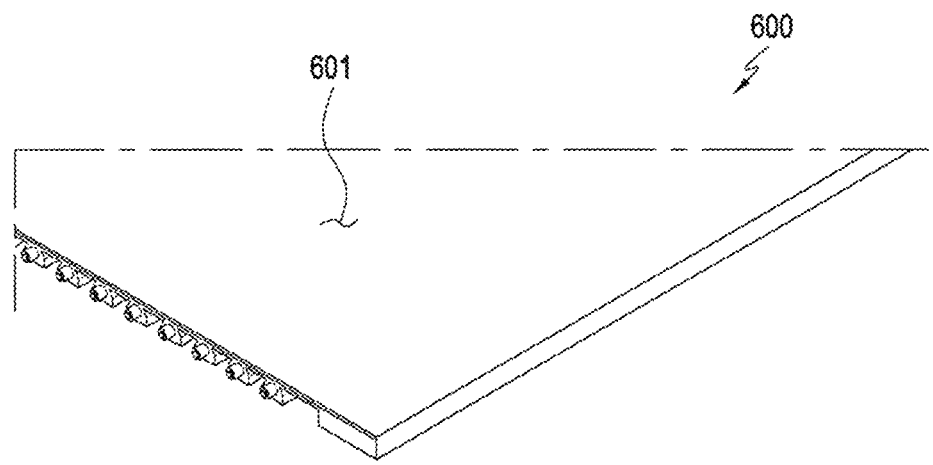
FIG. 22 is a view illustrating a reinforcement area according to an embodiment.
Figure 23:
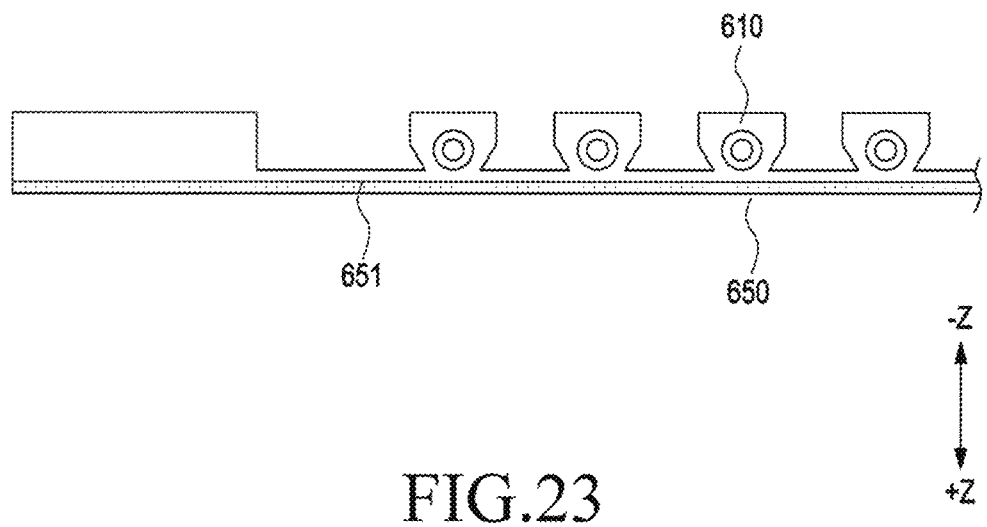
FIG. 23 is a side view of the lattice module according to an embodiment.
Figure 24:
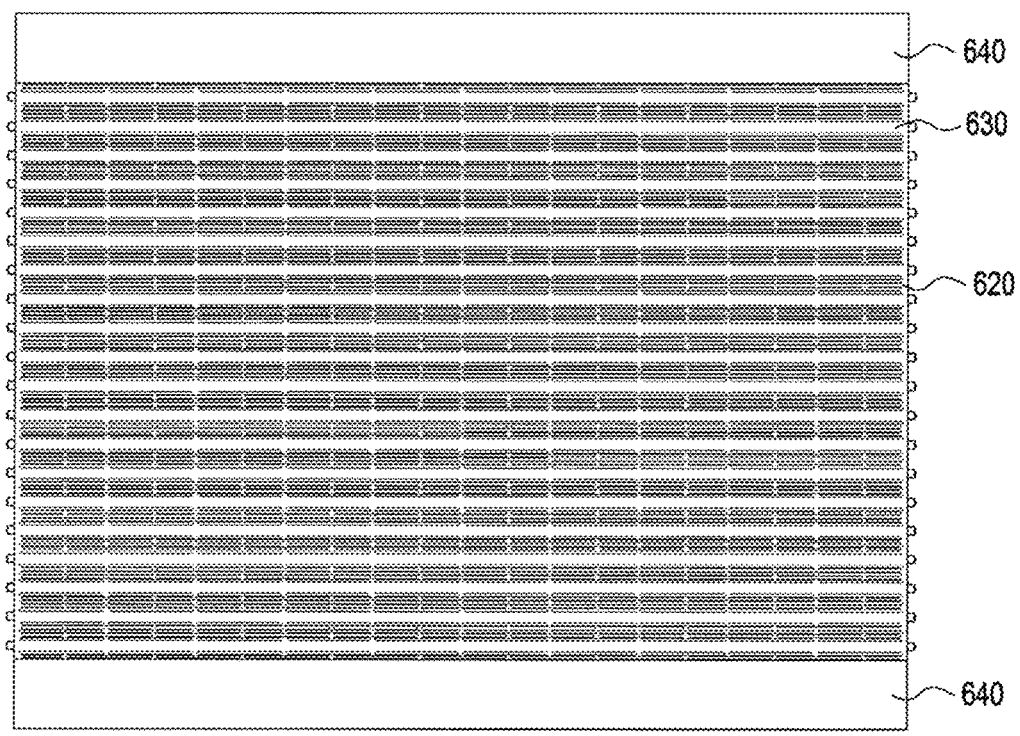
FIG. 24 is a rear view of a lattice module in which lattice areas are formed according to an embodiment.
Figure 25:
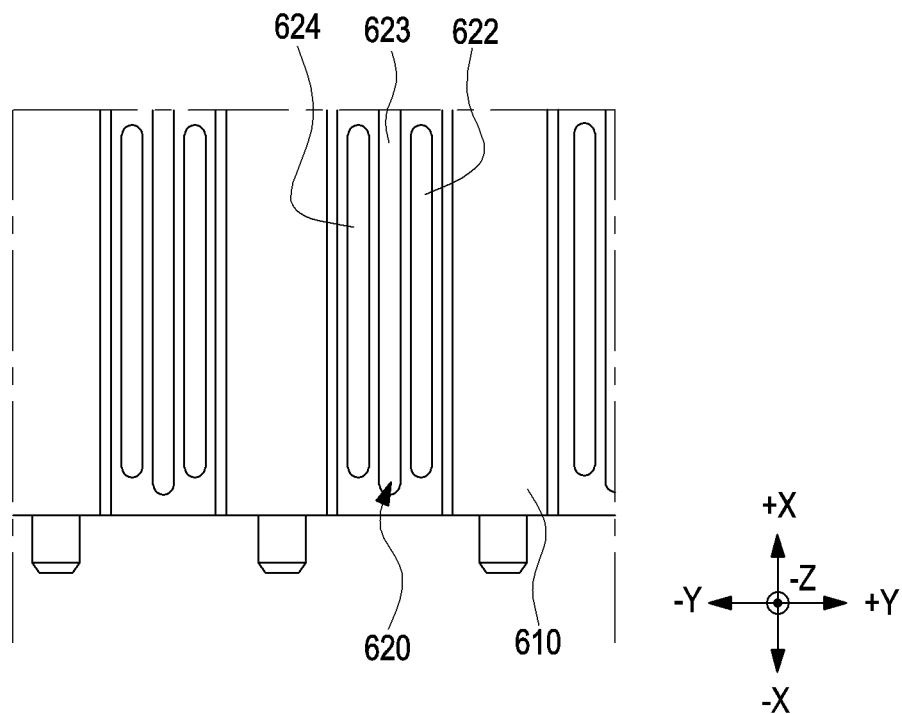
FIG. 25 is an enlarged view of lattice areas according to an embodiment.
Figure 26:
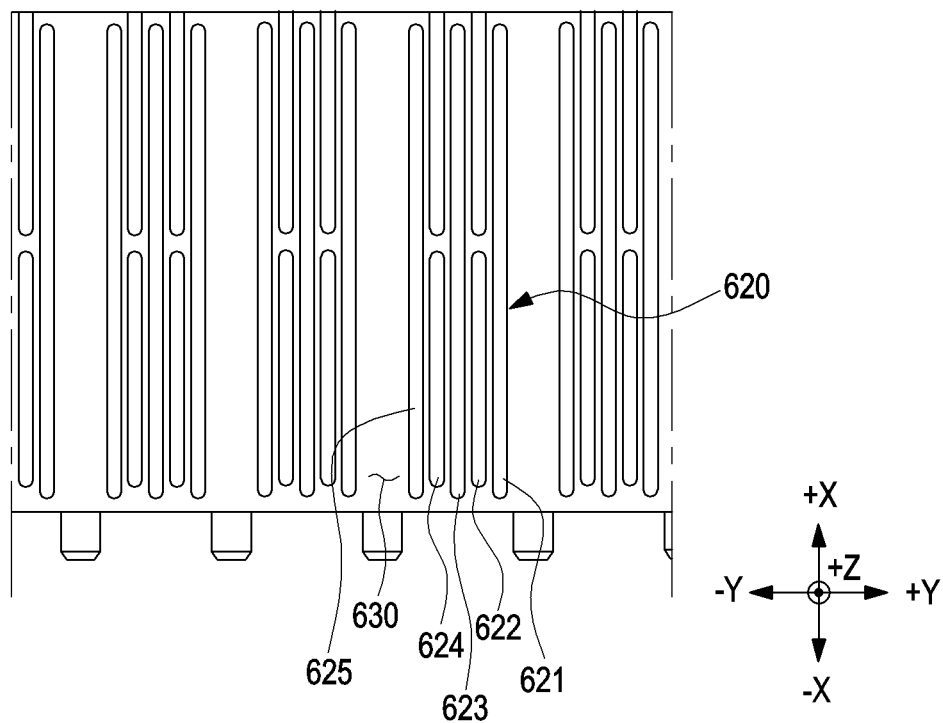
FIG. 26 is a view illustrating lattice areas according to an embodiment from another angle.
Figure 27:
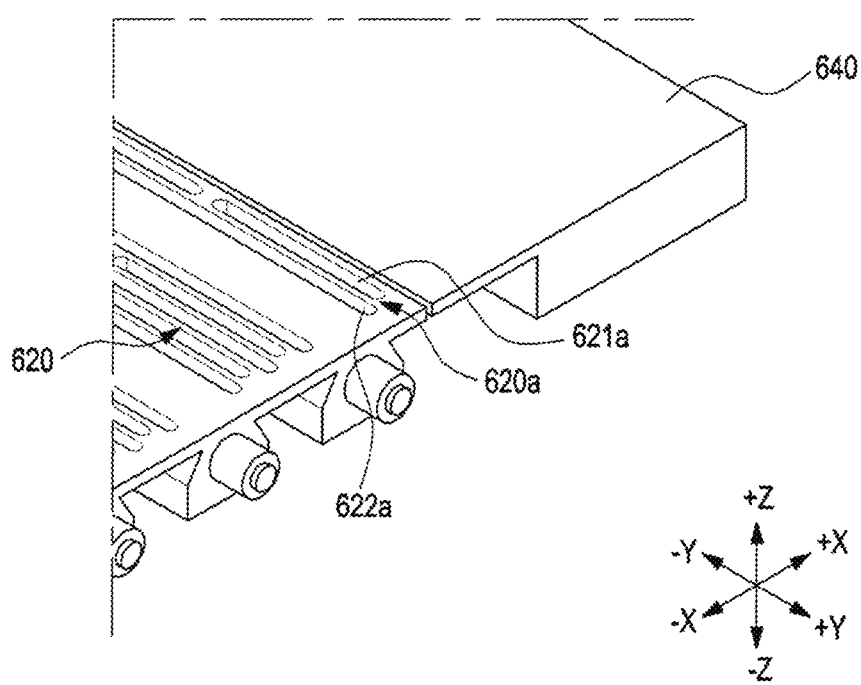
FIG. 27 is a view illustrating a reinforcement area and lattice areas according to an embodiment.

FIG. 20 is a flowchart schematically illustrating a process of etching a lattice module according to an embodiment. FIG. 21 is a view illustrating a shape-machined lattice module according to an embodiment. FIG. 22 is a view illustrating a reinforcement area according to an embodiment. FIG. 23 is a side view of the lattice module according to an embodiment. FIG. 24 is a rear view of a lattice module in which lattice areas are formed according to an embodiment. FIG. 25 is an enlarged view of lattice areas according to an embodiment. FIG. 26 is a view illustrating lattice areas according to an embodiment from another angle. FIG. 27 is a view illustrating a reinforcement area and lattice areas according to an embodiment.

Referring to FIGS. 20 to 27, a lattice module etching process may include a process of etching a reinforcement area (422), a process of forming lattice areas (424), and a process of removing an auxiliary area (426).

According to an embodiment, a shape-machined first surface 601 of a lattice material 600 (e.g., support material) may be etched. In an embodiment (see FIGS. 22 and 23), at least a partial area of the lattice material 600 in a first vertical direction (the +z-axis direction) may be provided as a reinforcement area 650. In other words, an area having a predetermined thickness in the vertical direction (the z-axis direction) from the first surface 601 of the shape-machined lattice material 600 may be described as the reinforcement area 650. In an embodiment, the reinforcement area 650 may reduce the deformation of and damage to the lattice material (e.g., the lattice material 500 of FIGS. 15 to 19 and the lattice material 600 of FIGS. 20 to 27) during the process of manufacturing a lattice module (e.g., the lattice module 300 of FIG. 7). In other words, the lattice material 600 before being machined into a lattice module (e.g., the lattice module 300 in FIG. 7) is made thick by the reinforcement area 650 to reduce damage and deformation during the manufacturing process, and the reinforcement area 650 is removed through an etching process. Thus, the completed lattice module (e.g., the lattice module 300 of FIG. 7) may have a thickness smaller than that of the lattice material 600. For example, a first surface 301 of the completed lattice module (e.g., the lattice module 300 of FIG. 7) may correspond to a first surface 651 of the lattice material 600 from which the reinforcement area 650 has been removed.

According to an embodiment (see FIGS. 25 and 26), an etching process for forming lattice areas 620 on a first surface 601 and/or a second surface 602 of the lattice material 600 (e.g., a first area) may be performed. In an embodiment, the lattice areas 620 may each include a plurality of openings 621, 622, 623, 624, and 625. The plurality of openings 621, 622, 623, 624, and 625 may be referred to as first to fifth openings 621, 622, 623, 624, and 625, respectively. However, the illustrated embodiments are only some embodiments of the spirit of the disclosure, and various modifications are possible. That is, the number or shapes of the openings included in the lattice area 620 should not be interpreted as being limited to the illustrated embodiment.

According to an embodiment, a predetermined number of openings 621, 622, 623, 624, and 625 may be included in the lattice area 620, and the openings may have predetermined shapes. In order to form the plurality of openings 621, 622, 623, 624, and 625, masking for providing shapes corresponding to the openings 621, 622, 623, 624, and 625 may be performed. The first surface 601 or the second surface 602 of the masked lattice material 600 may be etched, and lattice areas 620 may be formed. In some embodiments, on the second surface 602, masking and etching processes are performed between every two adjacent bars 610, and as a result, the lattice areas 620 may not be formed in some portions (e.g., the support areas 630) of the first surface 601 corresponding to the second areas (e.g., the second areas 314 in FIG. 11). In other words, since only the areas between adjacent bars 610 are etched, the lattice areas 620 and the support areas 630 facing each of the plurality of bars 610 may be alternately formed on the first surface 601. In some embodiments, the lattice areas 620 may be evenly formed on the first surface 601. For example, the support areas 630 may not be formed on the first surface 601 and only the lattice areas 620 may be formed. In this case, masking may be performed on the first surface 601.

According to an embodiment (see FIGS. 25 and 26), the plurality of openings 621, 622, 623, 624, and 625 may be all exposed when viewed from a direction perpendicular to the first surface 601. As another example, when viewed from a direction perpendicular to the second surface 602, at least some of the openings 621 and 625 may be covered by the plurality of bars 610. In other words, when viewed from a direction perpendicular to the second surface 602, it may be described that the first openings 621 and the fifth openings 625 are at least partially overlap at least some of the plurality of bars 610.

According to an embodiment (see FIG. 27), the auxiliary area 640 may be removed. In an embodiment, a partial area of the lattice material 600 adjacent to the auxiliary lattice area 620a may be etched so as to remove the auxiliary area 640 disposed at the edge area in the short side direction (the x-axis direction) of the lattice material 600.

According to an embodiment, the auxiliary lattice area 620a may include a first auxiliary opening 621a and a second auxiliary opening 622a. As described above, the auxiliary lattice area 620a may have a shape different from that of the lattice areas 620. For example, the auxiliary lattice area 620a may include auxiliary openings 621a and 622a corresponding to some of the openings 621, 622, 623, 624, and 625 included in the lattice areas 620 (e.g., the first openings 621 and/or the second openings 622). In some embodiments, the auxiliary openings 621a and 622a formed in the auxiliary lattice area 620a and the openings 621, 622, 623, 624, and 625 formed in the lattice areas 620 may have different shapes.

Figure 28:
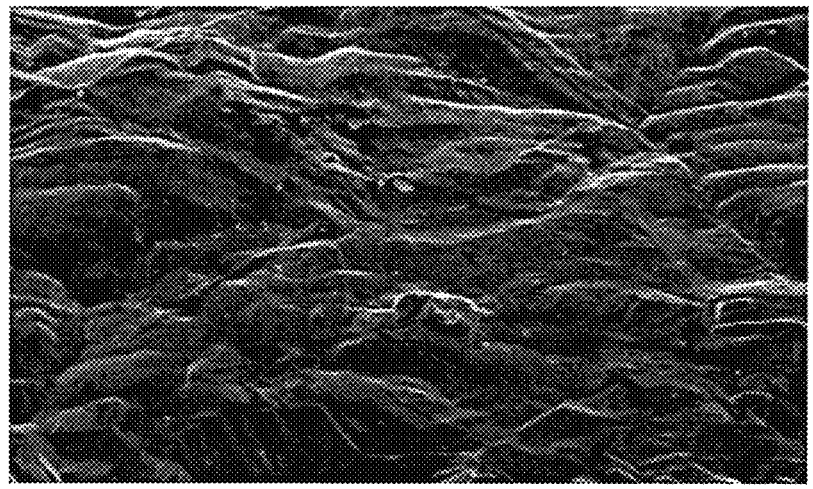
FIG. 28 is a view showing a portion of an etched surface of a lattice material according to an embodiment.
Figure 29:
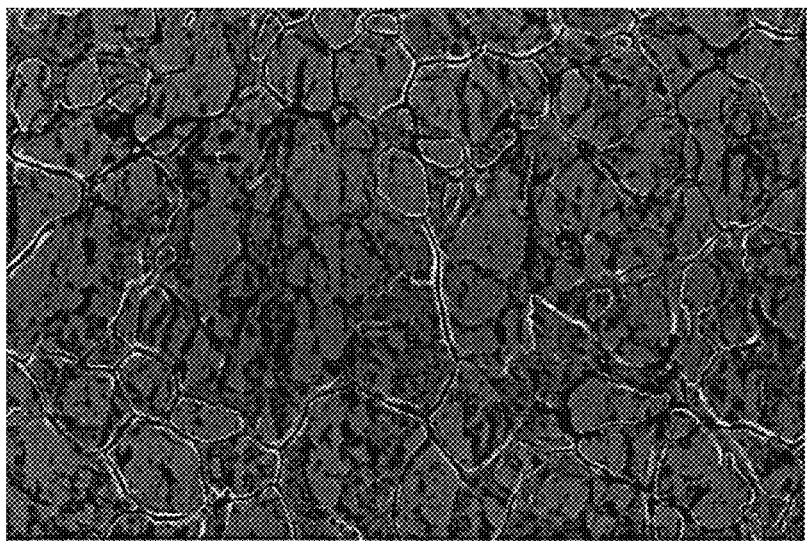
FIG. 29 is a view showing another portion of the etched surface of the lattice material according to an embodiment.
Figure 30A:
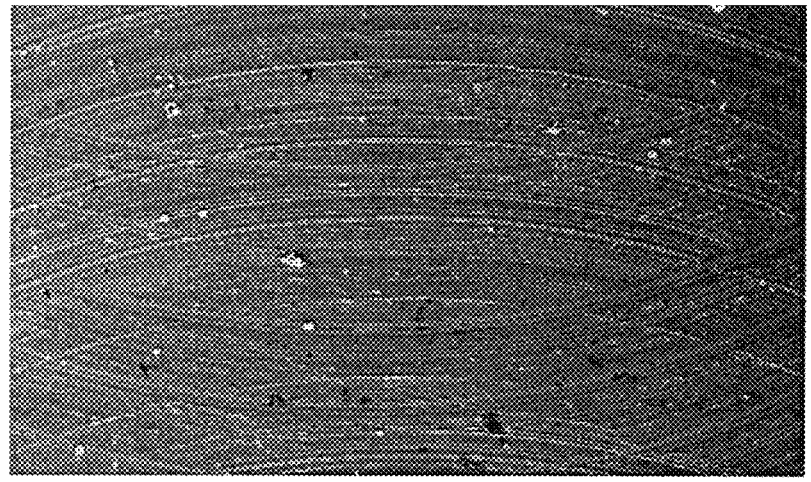
FIGS. 30A and 30B are views showing the surfaces of bars having a pattern a predetermined directionality according to an embodiment, respectively.
Figure 30B:
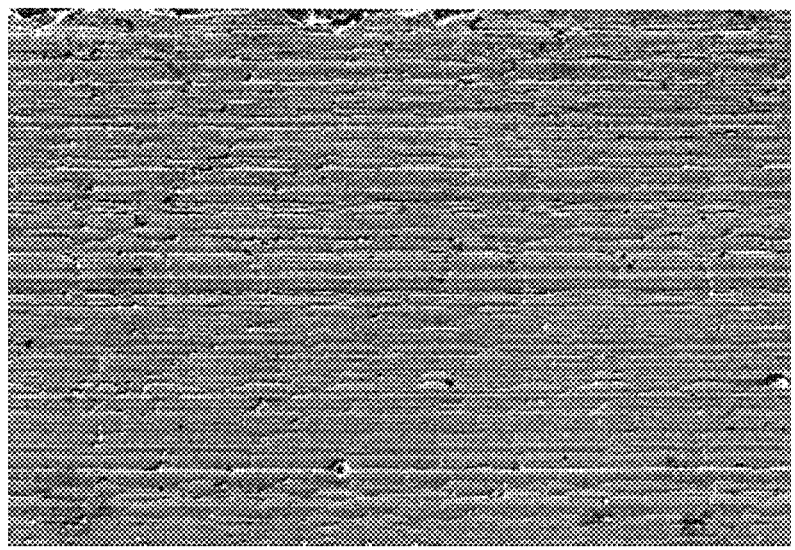

FIG. 28 is a view showing a portion of an etched surface of a lattice material according to an embodiment. FIG. 29 is a view showing another portion of the etched surface of the lattice material according to an embodiment. FIGS. 30A and 30B are views showing the surfaces of bars having a pattern a predetermined directionality according to an embodiment, respectively. In describing FIG. 28, FIG. 29, FIG. 30A, and/or FIG. 30B, the reference numerals described above with reference to FIGS. 20 to 27 may be referred to together.

According to an embodiment (mainly see FIG. 28), some portions of the etched surface of the lattice material 600 (e.g., the reinforcement area 650) may not have a burr and a directional pattern, unlike some portions of the surface (e.g., the inclined surface 515 of FIG. 19) of the shape-machined (e.g., cut) lattice material (e.g., the lattice material 500 of FIG. 16). In other words, since some portions of the etched surface of the lattice material 600 is generally peeled by the etching solution (or laser), a non-directional pattern may be formed and no burr may be formed.

According to an embodiment (mainly see FIG. 29), in order to form a predetermined pattern (e.g., a plurality of openings 621, 622, 623, 624, and 625), masking may be performed on some portions of the surface of the lattice material 600 (e.g., the first surface 601 or the second surface 602). After an etching process is performed on the masked areas, the masking may be removed. In this case, an alkaline solution may be applied to some portions of the surface of the lattice material 600 (e.g., the first surface 601 or the second surface 602). In an embodiment, in some portions of the surface of the lattice material 600 to which the alkaline solution has been applied, at least some grain boundaries may be etched, and crystal grains may be observed.

In an embodiment, referring to FIGS. 30A and 30B, it may be described that, in some portions of the shape-machined (e.g., cut) lattice material (e.g., the inclined surfaces 515 of FIG. 19), a pattern having a predetermined directionality and/or a burr may be observed and in some portions (e.g., the first surface 601 or the second surface 602) of the etched lattice material, crystal grains may be observed.

Figure 31:
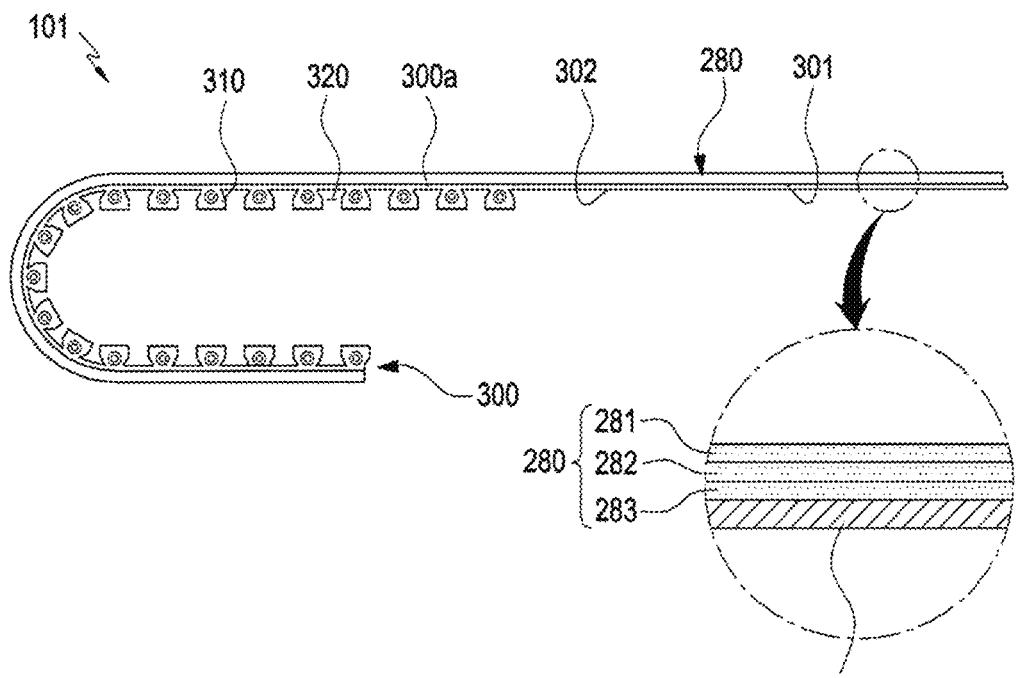
FIG. 31 is a side view illustrating a display to which a lattice module according to an embodiment of the disclosure is coupled.
Figure 32:
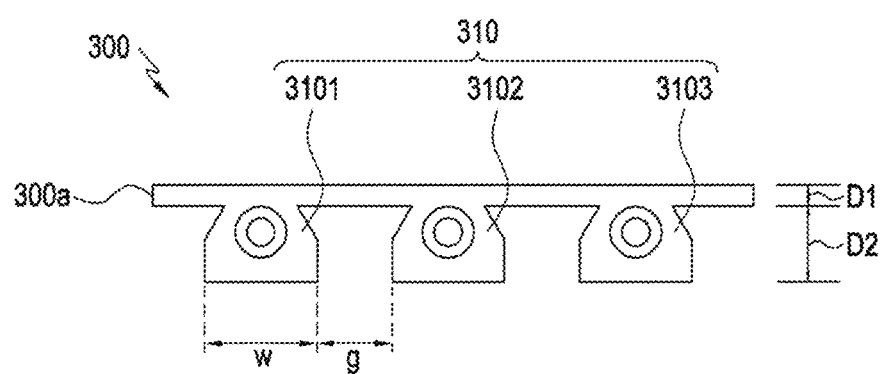
FIG. 32 is a side view of a lattice module according to an embodiment of the disclosure.

FIG. 31 is a side view illustrating a display to which a lattice module according to an embodiment of the disclosure is coupled. FIG. 32 is a side view of a lattice module according to an embodiment of the disclosure.

Referring to FIG. 31, the electronic device 101 may include a display 280 and a lattice module 300. Referring to FIG. 31 and/or FIG. 32, the lattice module 300 may include a plurality of bars 310. The configuration of the display 280 of FIG. 31 is wholly or partly the same as the configuration of the display 203 of FIGS. 2 to 4B, and the configuration of the lattice module 300 and the plurality of bars 310 of FIG. 31 and/or FIG. 32 may be wholly or partly the same as the configuration of the lattice module 300 and/or the plurality of bars 310 of FIGS. 7 to 11.

According to an embodiment, the display 280 may include a cover window 281, a display panel 282, and a cover panel 283.

The cover window 281 may protect at least a portion of the display 280 (e.g., the display panel 282). For example, the cover window 281 may be located above the display panel 282. The cover window 281 may be a substantially transparent protective member and/or a protective layer covering at least a portion of the display panel 282.

According to an embodiment, the cover window 281 may reduce damage (e.g., scratches) to the display panel 282. For example, the cover window 281 may be ultra-thin glass (UTG) or flexible thin glass (FTG). According to an embodiment, the cover window 281 may be a polyimide (PI) film.

According to an embodiment, the display panel 282 may visually provide information to the outside of the electronic device 101 (e.g., a user). The display panel 282 may include, for example, a hologram device or a projector and a control circuit for controlling the corresponding device. According to an embodiment, the display panel 282 may include a touch sensor configured to detect touches or a pressure sensor configured to measure the intensity of force generated by the touches. The display panel 282 may be located between the cover window 281 and the cover panel 283.

According to an embodiment, the cover panel 283 may support the display panel 282. The cover panel 283 may be located between the display panel 282 and the lattice module 300.

According to an embodiment, the lattice module 300 may support at least a portion of the display 280 (e.g., the cover panel 283). For example, the lattice module 300 may be attached to the cover panel 283 of the display 280. An adhesive layer or adhesive tape interconnecting the lattice module 300 and the cover panel 283 may be omitted for convenience of description.

According to an embodiment, the lattice module 300 may include a plate 300a and a plurality of bars 310. The lattice module 300 may be integrally formed by using a shape-machining process. For example, the plate 300a and the plurality of bars 310 may be integrally formed through the shape-machining process. For example, the plurality of bars 310 may each include a second area (e.g., the second area 314 of FIG. 12) extending from the plate 300a and a first area (e.g., the first area 312 of FIG. 12) extending from the second area 314.

According to an embodiment, the bars 310 may extend on the plate 300a. For example, the lattice module 300 may include a first surface 301 and a second surface 302 opposite to the first surface 301. The first surface 301 and the second surface 302 may be surfaces of the plate 300a. For example, the plate 300a may include the first surface 301 and the second surface 302 opposite to the first surface 301. At least a portion of the plate 300a may be located between the plurality of bars 310 and the display 280.

According to an embodiment, the lattice module 300 may be formed through a shape-machining process and/or an etching process. For example, the first surface 301 of the plate 300a may be produced through a shape-machining process (e.g., cutting process or shearing process). For example, due to the cutting process, a pattern may be formed of the first surface 301. For example, the first surface 301 may include a wavy pattern, a circular pattern, a straight-line pattern, and/or a burr according to the cutting process.

According to an embodiment, the second surface 302 of the plate 300a may be formed through a shape-machining process and an etching process. For example, at least a portion of the second surface 302 of the plate 300a may include a surface shape formed due to the etching process. According to an embodiment, the lattice area 320 may be formed through an etching process. The second surface 302 may provide at least some of the lattice areas 320. According to an embodiment, the first surface 301 of the plate 300a may support the display 280. For example, the first surface 301 may face and support the cover panel 283 of the display 280. The plurality of bars 310 may extend on the second surface 302. For example, the plurality of bars 310 may be a part of the lattice module 300 formed through a shape-machining process of a lattice material (e.g., the lattice material 500 of FIG. 16).

According to an embodiment, there is a trade-off relationship between securing a certain size (e.g., thickness) of a lattice module for stably supporting a display in an electronic device and reducing the size of the lattice module for mounting space efficiency inside the electronic device. As the electronic device of the present disclosure provides an integrated structure of the lattice module 300, an improvement in the ratio between the lattice area of the lattice module 300 and the multi-bar, and a rigid area (e.g. reinforcement area 650 and/or auxiliary area 640) added only during the process of the lattice module 300, It is possible to reduce the thickness of the lattice module and provide stable rigidity for display support.

According to an embodiment, a reinforcement area (e.g., the reinforcement region 650 of FIG. 23) may be required based on the thickness of the lattice module 300. For example, the lattice module 300 of an embodiment may include the reinforcement area 650. The lattice module 300 may include lattice areas 320 (e.g., the lattice areas 320 of FIG. 12 and/or FIG. 13). According to an embodiment, when the length (or thickness) of the lattice areas 320 of the lattice module 300 is about 0.05 mm to about 0.2 mm, the reinforcement area 650 may be required. Due to the reinforcement area 650, the strength of the lattice module 300 obtained due to machining (e.g., a shape-machining process) may be improved, and damage to the lattice module 300 may be reduced or prevented. For example, without the reinforcement region 650, when the thickness of the lattice module 300 is equal to or less than about 0.2 mm, deformation and tool chatter may occur during a shape-machining process (e.g., cutting), and the quality of the workpiece may be degraded.

According to an embodiment, the thickness of the lattice area of the lattice module 300 (hereinafter, a first thickness D1) may be approximately 0.05 mm to 0.2 mm. If the lattice module has a thickness exceeding 0.2 mm, it may not be helpful for mounting efficiency of the electronic device due to the large thickness. In addition, the flesh around the opening formed in the lattice module may be broken due to repeated bending (e.g., life test), or the inflow of foreign substances may increase due to an increase in the thickness of the opening.

According to an embodiment, the thickness of each of the plurality of multi-bars 310 of the lattice module 300 (hereinafter, a second thickness D2) may be approximately 0.3 mm to 1.0 mm. For example, the second thickness D2 of the plurality of multi-bars 310 may be approximately 0.3 mm to 0.8 mm. The second thickness D2 of the multi-bar 310 may be formed to correspond to the thickness of a portion of the second housing (e.g., the second plate 221 of the second housing 202 in FIG. 4A) disposed parallel to one side of the multi-bar 310. The multi-bar 310 may be formed to correspond to or smaller in consideration of the thickness of the second housing around the multi-bar 310, so that contact with other instruments may not occur during sliding movement.

According to an embodiment, the thickness of each of the plurality of multi-bars 310 of the lattice module 300 (hereinafter, a second thickness D2) may be approximately 0.3 mm to 1.0 mm. For example, the second thickness D2 of the plurality of multi-bars 310 may be approximately 0.3 mm to 0.8 mm. The second thickness D2 of the multi-bar 310 may be formed to correspond to the thickness of a portion of the second housing (e.g., the second plate 221 of the second housing 202 in FIG. 4A) disposed parallel to one side of the multi-bar 310. The multi-bar 310 may be formed to correspond to or smaller in consideration of the thickness of the second housing around the multi-bar 310, so that contact with other instruments may not occur during sliding movement.

According to an embodiment, a ratio between the first thickness D1 of the lattice area and the second thickness D2 of each of the plurality of multi-bars 310 may be approximately 1:1.5 to 1:20. In the electronic device according to the present disclosure, as the first thickness D1 is reduced for mounting space efficiency and the second thickness D2 of a certain size or more is secured for stable support of the display, the thickness issue of the lattice module 300 in the trade-off relationship can be solved.

According to an embodiment, individual bars 3101, 3102, and 3103 of the plurality of bars 310 may be spaced apart by a predetermined distance. For example, the plurality of bars 310 may include bars (e.g., a first bar 3101, a second bar 3102, and a third bar 3103) spaced apart from each other. According to an embodiment, the width w of one of the plurality of bars (e.g., the first bar 3101, the second bar 3102, and the third bar 3103) may be greater than the interval g of the plurality of bars 310. For example, the interval g of the plurality of bars 310 may be the distance between the first and second bars 3101 and 3102. For example, the distance between the second bar 3102 and the third bar 3103 and the distance between any two bars 310 adjacent to each other may be constant, for example, can be spaced apart by the interval g. In an embodiment, the ratio of the width w of the plurality of bars 310 to the interval g of the plurality of bars 310 may be about 0.15:0.1.

According to an embodiment, when the lattice module 300 is bent, the ratio of the width w of the plurality of bars 310 to the interval g of the plurality of bars 310 may be increased. For example, in an embodiment, the interval g of the plurality of bars 310 may decrease as the display 280 is bent. For example, in an embodiment, in the substantially unbent state (e.g., the flat area), the ratio of the width w of the plurality of bars 310 to the interval g of the plurality of bars 310 may be about 1.6:0.35. For example, in an embodiment, in at least the partially bent state (e.g., the curved area), the ratio of the width w of each of the plurality of bars 310 to the interval g of the plurality of bars 310 may be about 1.6:0.132. According to an embodiment, as the ratio of the width of each of the plurality of bars 310 to the interval g of the plurality of bars 310 increases, lifting caused by the repulsive force of the display 280 may be reduced. In the position where the lattice module 300 is bent, lifting due to the repulsive force of the display 280 may be reduced. According to an embodiment, the width and/or interval of the plurality of bars 310 may be selectively designed depending on the repulsive force of the display 280.

According to an embodiment, the ratio of the width w of the plurality of bars 310 to the interval g of the plurality of bars 310 may be changed based on the curvature of the lattice module 300. According to an embodiment, the widths, shapes, number and/or sizes of the lattice areas 320 may be selectively designed. For example, based on the required structure of the electronic device 101 (e.g., the material of the display 280 and/or the lattice module 300), the number of patterns, the lengths, the widths, the thicknesses of the lattice areas 320, and/or the intervals of the patterns of the lattice areas 320 may be selectively designed.

An electronic device (e.g., a portable terminal) may include a display having a flat surface display or a flat surface and a curved surface. An electronic device including a display may have a limitation in implementing a screen larger than the size of the electronic device due to a fixed display structure. Accordingly, electronic devices including a rollable display have been researched.

An electronic device may include a lattice module for supporting a rollable display. The lattice module may include a multi-bar structure in which a plurality of bars is disposed. The multi-bar structure may operate along the operating trajectory of the rollable display. However, when the multi-bar structure is separately attached on a plate, the thickness of the lattice module may be increased and thus space efficiency inside the electronic device may be degraded, and the plurality of bars may be separated from the plate.

According to an embodiment of the disclosure, it is possible to provide an electronic device including a lattice module configured integrally with a multi-bar structure and a plate.

The problems to be solved in the disclosure are not limited to the above-mentioned problems may be expanded in various ways without departing from the spirit and scope of the disclosure.

According to an embodiment of the disclosure, by providing a lattice module configured integrally with a multi-bar structure, it is possible to improve space efficiency inside an electronic device and to improve rigidity of the lattice module.

In addition, various effects directly or indirectly identified through the disclosure may be provided.

According to an embodiment, an electronic device may include housings including a first housing (e.g., the first housing 201 in FIG. 2) and a second housing (e.g., the second housing 202 in FIG. 2) configured to accommodate at least a portion of the first housing and guide sliding of the first housing, a flexible display (e.g., the display 203 in FIG. 2) including a first display area connected to the first housing and a second display area extending from the first display area, and a lattice module (e.g., the lattice module 300 of FIG. 7) configured to support at least a portion of the second display area. The lattice module may include a plate (e.g., the plate 300a in FIG. 7), and a plurality of bars (e.g., the plurality of bars 310 of FIG. 7) disposed side by side on the plate. Each of the plurality of bars may include a second area (e.g., the second area 314 in FIG. 11) extending from the plate and a first area (e.g., the first area 312 in FIG. 11) extending from the second area. A first width of the first area may be greater than a second width of the second area. The plate may include a lattice area (e.g., the lattice area 320 in FIGS. 11 to 13) located between adjacent ones of the plurality of bars and including a plurality of openings, and the plate and the plurality of bars may be integrally formed through a shape-machining process.

According to an embodiment, the flexible display may include a cover window (e.g., the cover window 281 of FIG. 31), a display panel (e.g., the display panel 282 of FIG. 31) located under the cover window, and a cover panel (e.g., the cover panel 283 of FIG. 31) located under the display panel. The plate may include a first surface (e.g., the first surface 301 in FIG. 11) configured to support the cover panel and a second surface (e.g., the second surface 302 in FIG. 11)

opposite to the first surface. The plurality of bars may be disposed on the second surface.

According to an embodiment, the first surface may be formed through a shape-machining process, and the second surface may be formed through an etching process.

According to an embodiment, it may be possible to provide an electronic device, in which, when viewed from a direction perpendicular to one surface (e.g., the second surface 302) of the plate, the first area of each of the plurality of bars overlaps at least some of the openings provided in the lattice area.

According to an embodiment, it may be possible to provide an electronic device, in which the lattice module includes a second surface opposite to the first surface, and the second surface includes a support area (e.g., the support area 330 in FIGS. 11 to 13) facing the first area of each of the plurality of bars, and the lattice area and the support area are alternately disposed.

According to an embodiment, it may be possible to provide an electronic device, in which, when viewed from a direction perpendicular to one surface (e.g., the first surface 301) of the plate, the plurality of openings provided in the lattice area are exposed.

According to an embodiment, it may be possible to provide an electronic device, in which each of the plurality of bars includes an inclined surface that configures a side surface of the second area and forms a predetermined angle with one surface (e.g., the second surface 302) of the plate.

According to an embodiment, it may be possible to provide an electronic device, in which a pattern having a predetermined directionality is disposed on the inclined surface.

According to an embodiment, it may be possible to provide an electronic device, in which the housings further include a guide plate (e.g., the guide rails 215 in FIG. 4A) including concave rails (e.g., the rails 215a in FIG. 4A), and each of the plurality of bars further includes a protrusion extending from an edge area and operatively connected to the concave rails.

According to an embodiment, it may be possible to provide an electronic device, in which a pattern having a predetermined directionality is disposed on a surface of each of the plurality of bars around the protrusion.

According to an embodiment, it may be possible to provide an electronic device, in which crystal grains are disposed in at least a portion of the support area adjacent to the lattice area.

According to an embodiment, it may be possible to provide an electronic device further including a motor structure disposed on the first housing and configured to generate a driving force for sliding of the housing.

According to an embodiment, it may be possible to provide an electronic device further including a gear connected to the motor structure and configured to rotate based on the driving force and a rack connected to the second housing.

According to an embodiment, it may be possible to provide an electronic device, in which at least a portion of the guide plate is configured to face the rack.

According to an embodiment, at least a portion of the second display area may be connected to the lattice module.

According to an embodiment, a method of manufacturing a lattice module used in a rollable device may include a process of forming a plurality of bars (e.g., the plurality of bars 310 in FIG. 8) by cutting at least a portion of a second surface of a lattice material (e.g., the lattice material 500 in FIG. 16) including a first surface and a second surface opposite to the first surface, a process of forming a plurality of protrusions (e.g., the protrusions 304 in FIG. 9) by cutting at least another portion of the lattice material, and a process of forming a lattice area (e.g., the lattice area 320 of FIG. 9) by etching at least a portion of the lattice material. Each of the plurality of bars may include a second area extending from the second surface and a first area extending from the second area. A first width of the first area may be greater than a second width of the second area. The lattice area may be located between adjacent ones the plurality of bars and may include a plurality of openings extending from the first surface to the second surface.

According to an embodiment, the lattice module manufacturing process may further include a process of etching a reinforcement area (e.g., the reinforcement area 650 in FIG. 23) provided on the first surface. The reinforcement area may be provided to at least a partial area of the lattice material having a predetermined thickness in a direction perpendicular to the first surface from the first surface. The process of etching the reinforcement area may be performed after the process of forming the plurality of bars. For example, the process of etching the reinforcement area may remove the reinforcement area for preventing deformation that may occur during the process of forming the plurality of bars. By etching the reinforcement area, the lattice module may have a thickness smaller than that of the lattice material.

According to an embodiment, the lattice module manufacturing process may further include manufacturing an auxiliary area (e.g., the auxiliary area 640 in FIG. 21). The auxiliary area may be disposed in an edge area of the lattice material and configured to reduce damage to or deformation of the lattice material during the manufacturing of the lattice module.

According to an embodiment, the process of forming the lattice area may further include a process of performing masking on the second surface between adjacent ones of the plurality of bars, and a process of etching the masked second surface. According to an embodiment, it may be possible to provide a lattice module manufacturing process further including a process of performing masking on the first surface and a process of etching the masked first surface.

According to an embodiment, the lattice module manufacturing process may further include an auxiliary lattice area (e.g., the auxiliary lattice area 620a in FIG. 27) in an edge area of the lattice material.

According to an embodiment, the lattice module (e.g., the lattice module 300 in FIG. 11) may include a plate (e.g., the plate 300a in FIG. 7), and a plurality of bars (e.g., the plurality of bars 310 of FIG. 8) disposed side by side on the plate. Each of the plurality of bars may include a second area (e.g., the second area 314 in FIG. 11) extending from one surface (e.g., the second surface 302 in FIG. 11) of the plate and a first area (e.g., the first area 312 in FIG. 11) extending from the second area. The plate may include a lattice area (e.g., the lattice area 320 in FIG. 10) disposed between adjacent ones of the plurality of bars and including a plurality of openings, when viewed from above the second surface of the plate, at least some of the plurality of openings may overlap at least a portion of the second area, and when viewed from above the first surface of the plate, the plurality of openings may be exposed to the outside, and the plate and the plurality of bars may be integrally formed through a shape-machining process.

According to an embodiment, an electronic device comprises housings including a first housing and a second housing configured to accommodate at least a portion of the first housing and guide sliding of the first housing, a flexible display including a first display area and a second display area extending from the first display area, and a monolithic support structure configured to support at least a portion of the second display area. The support structure includes a plate part and a plurality of bar-shaped parts protruding side by side from the plate part and disposed parallel to the plate part. The plate part and the plurality of bar-shaped parts are formed from a single monolithic structure. Each of the plurality of bar-shaped parts includes a second portion extending from the plate part and a first portion extending from the second portion, and a first width of the first portion is greater than a second width of the second portion. The plate part includes a plurality of openings located between adjacent ones of the bar-shaped parts. According to an embodiment, the flexible display may further comprise a cover window, a display panel located under the cover window, and a cover panel located under the display panel. The plate part may further comprise a first surface configured to support the cover panel and a second surface opposite to the first surface, and the plurality of bar-shaped parts are extended on the second surface.

According to an embodiment, the thickness of a first area including the plurality of openings may be 0.05 mm to 0.2 mm.

According to an embodiment, a ratio between a thickness of a first area including the plurality of openings and a thickness of each of the plurality of protruding portions may be 1:1.5 to 1:20.

According to an embodiment, when viewed from a direction perpendicular to one surface of the plate part, the first portion of each of the plurality of bar-shaped parts may overlap at least a portion of the plurality of openings.

According to an embodiment, when viewed from a direction perpendicular to one surface of the plate part, the plurality of bar-shaped parts of the supporting structure and a first area including the plurality of openings may be alternately disposed.

According to an embodiment, when viewed from a direction perpendicular to first surface or the second surface of the plate part, the plurality of openings may be exposed.

According to an embodiment, in each of the plurality of bar-shaped parts, the second portion may be extended from the plate part in an acute angle with respect to the plate part and a first portion may be substantially 90-degree angle with respect to the plate part.

According to an embodiment, in each of the plurality of bar-shaped parts, both side surfaces of the second portion may form an acute angle with the second surfaces of the plate part and both side surfaces of the first portion may form a substantially 90-degree angle with the second surfaces of the plate part.

According to an embodiment, the support structure may be an integral structure extending seamlessly from the plate part to the plurality of bar-shaped parts.

According to an embodiment, a method of manufacturing a support structure used in a device may include forming a plurality of bar-shaped parts by cutting at least a portion of a second surface of a support material comprising a first surface and a the second surface opposite to the first surface, forming a plurality of protrusions by cutting at least a portion of the a side surface connecting the first surface and the second surface of the support material, and forming a first area by etching at least a portion of the support material. Each of the plurality of bar-shaped parts may include a second portion extending from the second surface and a first portion extending from the second portion, and the second portion has a width smaller than a first width of the first portion is greater than a second width of the second portion. The first area may be located between adjacent ones the plurality of bar-shaped parts and includes a plurality of openings extending from the first surface to the second surface.

According to an embodiment, a method of manufacturing a support structure used in a device may further include etching a reinforcement area provided on the first surface, wherein the etching of the reinforcement area is performed after the forming of the plurality of bar-shaped parts. the reinforcement area may be provided to at least a partial area of the support material having a predetermined thickness in a direction perpendicular to the first surface from the first surface.

According to an embodiment, the forming the plurality of bar-shaped parts may further comprise cutting at least a portion of the second surface while leaving an auxiliary area on at least a portion of an edge area of the support material. The method may further comprise removing the auxiliary area, and the auxiliary area may be disposed in the edge area of the support material and is provided as an area where the support material can be supported within manufacturing equipment during manufacturing process.

According to an embodiment, the forming of the first area may further comprise performing masking on the second surface between adjacent ones of the plurality of bar-shaped parts and etching at least a portion of the masked second surface.

According to an embodiment, the forming of the firstice area may further comprise performing masking on the first surface and etching at least a portion of the masked first surface.

According to an embodiment, a method of manufacturing a support structure used in a device may further include forming an auxiliary support area in an edge area of the support material.

According to an embodiment, a support structure used in an electronic device may comprise a plate part including a first surface and a second surface opposite to the first surface, and a plurality of bar-shaped parts extending from the second surface of the plate part and protruding in parallel; thereon. Each of the plurality of bar-shaped parts may include a second portion extending from the second surface and a first portion extending from the second portion, The plate part may include a plurality of openings located between adjacent ones of the plurality of bar-shaped parts. When viewed from above the second surface of the plate part, at least some of the plurality of openings may overlap at least a portion of the first portion. When viewed in a view from above the first surface of the plate part, the plurality of openings may be exposed to the outside.

It may be apparent to a person ordinarily skilled in the technical field to which the disclosure belongs that the above-described electronic device including a multi-bar structure according to the disclosure is not limited by the above-described embodiments and drawings, and can be variously substituted, modified, and changed within the technical scope of the disclosure. While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
 - housings including a first housing and a second housing, the second housing accommodating at least a portion of the first housing and configured to provide mechanical guide a sliding movement of the first housing;
 - a flexible display including a first display area and a second display area extending from the first display area; and
 - a monolithic support structure configured to support at least a portion of the second display area,
 - wherein the support structure includes a plate part and a plurality of bar-shaped parts protruding side by side from the plate part and disposed parallel to the plate part,
 - wherein the plate part and the plurality of bar-shaped parts are formed from a single monolithic structure,
 - wherein each of the plurality of bar-shaped parts includes a second portion extending from the plate part and a first portion extending from the second portion, and a first width of the first portion is greater than a second width of the second portion, and
 - wherein the plate part includes a plurality of openings located between adjacent ones of the bar-shaped parts.

2. The electronic device of claim 1, wherein the flexible display further comprises a cover window, a display panel located under the cover window, and a cover panel located under the display panel, and
 - wherein the plate part further comprises a first surface configured to support the cover panel and a second surface opposite to the first surface, and the plurality of bar-shaped parts are extended on the second surface.

3. The electronic device of claim 2, wherein when viewed from a direction perpendicular to first surface or the second surface of the plate part, the plurality of openings are exposed.

4. The electronic device of claim 2, wherein in each of the plurality bar-shaped parts, both side surfaces of the second portion forms an acute angle with the second surfaces of the plate part and both side surfaces of the first portion forms a substantially 90-degree angle with the second surfaces of the plate part.

5. The electronic device of claim 1, wherein the thickness of a first area including the plurality of openings is 0.05 mm to 0.2 mm, and
 - where the first width of the first portion is greater than the second width of the second portion so as to reduce the flexibility of the monolithic support structure in rolling movements.

6. The electronic device of claim 1, wherein a ratio between a thickness of a first area including the plurality of openings and a thickness of each of the plurality of bar-shaped parts is 1:1.5 to 1:20.

7. The electronic device of claim 1, wherein when viewed from a direction perpendicular to one surface of the plate part, the first portion of each of the plurality of bar-shaped parts overlaps at least a portion of the plurality of openings.

8. The electronic device of claim 1, wherein when viewed from a direction perpendicular to one surface of the plate part, the plurality of bar-shaped parts of the support structure and a first area including the plurality of openings are alternately disposed.

9. The electronic device of claim 1, wherein in each of the plurality of bar-shaped parts, the second portion is extended from the plate part in an acute angle with respect to the plate part and a first portion is substantially 90-degree angle with respect to the plate part.

10. The electronic device of claim 1, wherein the support structure is an integral structure extending seamlessly from the plate part to the plurality of bar-shaped parts.

11. The electronic device of claim 1, wherein the housings further comprise a guide plate including concave rails, and
 - wherein each of the plurality of bar-shaped parts further includes a protrusion extending from an edge area and operatively connected to the concave rails.

12. The electronic device of claim 1, further comprising a motor structure disposed in the first housing and configured to generate a driving force for the sliding movement of the first housing.

13. The electronic device of claim 12, further comprising a gear connected to the motor structure and configured to rotate based on the driving force and a rack connected to the second housing,
 - wherein the housings further include a guide rail comprising concave rails, and
 - wherein at least a portion of the guide rail is configured to face the rack.

14. A method of manufacturing a support structure used in a device, the method comprising:
 - forming a plurality of bar-shaped parts by cutting at least a portion of a second surface of a support material comprising a first surface and the second surface opposite to the first surface;
 - forming a plurality of protrusions by cutting at least a portion of a side surface connecting the first surface and the second surface of the support material; and
 - forming a first area by etching at least a portion of the support material,
 - wherein each of the plurality of bar-shaped parts includes a first portion and a second portion, wherein the second portion extends from the second surface and the first portion extends from the second portion, wherein a width of the second portion grows as the second portion extends away from the second surface towards the first portion, and wherein a width of the first portion is greater than the width of the second portion near contact with the second surface, and
 - wherein the first area is located between adjacent ones the plurality of bar-shaped parts and includes a plurality of openings extending from the first surface to the second surface.

15. The method of claim 14, further comprising etching a reinforcement area provided on the first surface, wherein the etching of the reinforcement area is performed after the forming of the plurality of bar-shaped parts,
 - wherein the reinforcement area is provided to at least a partial area of the support material having a predetermined thickness in a direction perpendicular to the first surface from the first surface.

16. The method of claim 14, wherein the forming the plurality of bar-shaped parts further comprises cutting at least a portion of the second surface while leaving an auxiliary area on at least a portion of an edge area of the support material, and
 - wherein the method further comprises: removing the auxiliary area, and
 - wherein the auxiliary area is disposed in the edge area of the support material and is provided as an area where the support material can be supported within manufacturing equipment during manufacturing process.

17. The method of claim 14, wherein the forming of the first area further comprises:
 - performing masking on the second surface between adjacent ones of the plurality of bar-shaped parts; and etching at least a portion of the masked second surface.

18. The method of claim 14, wherein the forming of the first area further comprises:
performing masking on the first surface; and
etching at least a portion of the masked first surface.

19. The method of claim 14, further comprising forming an auxiliary support area in an edge area of the support material.

20. A support structure used in an electronic device including a first housing and a second housing, the second housing accommodating at least a portion of the first housing and configured to provide mechanical guide a sliding movement of the first housing; a flexible display including a first display area and a second display area extending from the first display area; and a monolithic support structure configured to support at least a portion of the second display area, the support structure comprising:
　a plate part including a first surface and a second surface opposite to the first surface; and
　a plurality of bar-shaped parts extending from the second surface of the plate part and protruding in parallel thereon,
wherein each of the plurality of bar-shaped parts includes a second portion extending from the second surface and a first portion extending from the second portion, in which a width of a part of the second portion is narrower than a width of the first portion,
wherein the plate part includes a plurality of openings located between adjacent ones of the plurality of bar-shaped parts,
wherein, when viewed from above the second surface of the plate part, at least some of the plurality of openings overlap at least a portion of the first portion, and
wherein, when viewed in a view from above the first surface of the plate part, the plurality of openings is exposed to the outside.

* * * * *